US 6,575,700 B2

(12) United States Patent
Arai et al.

(10) Patent No.: US 6,575,700 B2
(45) Date of Patent: Jun. 10, 2003

(54) STEAM TURBINE BLADE, AND STEAM TURBINE AND STEAM TURBINE POWER PLANT USING THE SAME

(75) Inventors: Masahiko Arai, Hitachi (JP); Shigeyoshi Nakamura, Hitachinaka (JP); Takeshi Onoda, Hitachi (JP); Masao Shiga, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/102,668

(22) Filed: Mar. 22, 2002

(65) Prior Publication Data

US 2002/0197163 A1 Dec. 26, 2002

Related U.S. Application Data

(62) Division of application No. 09/611,977, filed on Jul. 6, 2000.

(30) Foreign Application Priority Data

Jul. 9, 1999 (JP) .......................... 11-195380

(51) Int. Cl.[7] .............................. F01D 5/14
(52) U.S. Cl. ................... 415/200; 416/241 R
(58) Field of Search ................. 415/199.4, 199.5, 415/200, 216.1, 103; 416/241 R; 148/516, 335; 420/109

(56) References Cited

U.S. PATENT DOCUMENTS 4,342,542 A * 8/1982 Tan et al. .................. 416/224
5,961,284 A   10/1999 Kuriyama et al.
6,074,169 A * 6/2000 Siga et al. ............... 416/241 R
6,123,504 A * 9/2000 Shiga et al. ................ 415/200
6,129,514 A * 10/2000 Shiga et al. ................ 415/200
6,174,132 B1  1/2001 Shiga et al.
6,398,504 B1 * 6/2002 Arai et al. ............... 416/241 R

FOREIGN PATENT DOCUMENTS

| EP | 0 831 203 A2 | 3/1998 |
| EP | 0 881 360 A1 | 12/1998 |
| EP | 0 980 961 A1 | 2/2000 |
| EP | 1 041 261 A1 | 10/2000 |
| JP | 62-180040 | 8/1987 |
| JP | 10-317105 | 12/1998 |
| JP | 10-331659 | 12/1998 |
| JP | 2000-161006 | 6/2000 |
| WO | WO9730272 | 8/1997 |

OTHER PUBLICATIONS

Technical Report of Mitsubishi Heavy Industry, vol. 35, No. 1, Jan., 1998.

* cited by examiner

Primary Examiner—Ninh H. Nguyen
(74) Attorney, Agent, or Firm—Mattingly, Stanger & Malur, P.C.

(57) ABSTRACT

A steam turbine blade made of a martensite steel having high strength and high toughness, and a low pressure steam turbine and a steam turbine power generating plant using the steam turbine blades. The steam turbine blade is made of a martensite steel containing C of 0.13–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35; and N of 0.04–0.15%.

26 Claims, 16 Drawing Sheets

STEAM TURBINE BLADE, AND STEAM TURBINE AND STEAM TURBINE POWER PLANT USING THE SAME

This is a divisional application of U.S. Ser. No. 09/611,977, filed Jul. 6, 2000.

BACKGROUND OF THE INVENTION

The present invention relates to a novel steam turbine blade and, more particularly to a low pressure steam turbine having rotor blades in the final stage of the low pressure steam turbine made of a 12% Cr group steel and a steam turbine power plant using the low pressure steam turbine.

At the present time, 12Cr—Mo—Ni—V—N steel is used for steam turbine rotor blades. In recent years, it is required from the viewpoint of energy conservation to improve the thermal efficiency of a stream turbine, and it is required from the viewpoint of space conservation to make the components compact.

Employing long-length steam turbine blades is an effective means for improving the thermal efficiency of a steam turbine and for making the components compact. Therefore, the length of low pressure steam turbine blades in the final stage is being lengthened year by year. This trend makes the use condition of the steam turbine blades severer, and accordingly a higher strength material is required because the strength of the 12Cr—Mo—Ni—V—N steel is insufficient. As the strength of a material for the long blade, a high tensile strength of basic mechanical property is required.

Further, the material is required to be high in strength and high in toughness from the viewpoint of securing safety against rupture.

As structural materials having a tensile strength higher than that of the conventional 12Cr—Mo—Ni—V—N steel (a martensite group steel), Ni based alloys and Co base alloys are generally known. However, they are not suitable for the blade material because they are worse in hot workability, in cutting workability and in vibration damping characteristic.

WO97/30272 discloses a rotor blade in the final stage of a low pressure steam turbine made of a 12% Cr group martensite steel, and a low pressure steam turbine using the turbine blades and a steam turbine power plant using the low pressure steam turbine. Further, a low pressure turbine blade having a 48-inch blade length made of 17-4PH steel for a 3000 rpm turbine is described in Technical Report of Mitsubishi Heavy Industry, Vol. 35, No. 1 (January, 1998).

Rotor blades in the final stage of the low pressure steam turbine having a blade length of 43 inches for a 3000 rpm turbine and a blade length of 35.8 inches for a 3600 rpm turbine are described in WO97/30272. However, there is no description on a length of the blade longer than the above, and there is no description on shape of the blade nor size of the low pressure steam turbine either.

Further, the above-mentioned technical report does not describe on any remedy for a longer blade nor on strength and toughness of the 17-4PH steel.

SUMMARY OF THE INVENTION

An object of the present invention is to provide a steam turbine blade made of a martensite steel having high strength and high toughness which is capable of attaining a blade length above 48 inches for a 3000 rpm turbine and above 40 inches for a 3600 rpm turbine, and a low pressure steam turbine and a steam turbine power generating plant using the steam turbine blades.

The present invention is characterized by a steam turbine blade having a blade length above 45 inches for a 3000 rpm turbine or a blade length above 37.5 inches for a 3600 rpm turbine, which is made of a martensite steel having a 20° C. V-notch impact value larger than 6 kg·m/cm$^2$ and a 20° C. tensile strength larger than 140 kg/mm$^2$, preferably larger than 150 kg/mm$^2$, further preferably larger than 152 kg/mm$^2$. For the latter tensile strengths, 20° C. V-notch impact values are preferably larger than 5 kg·m/cm$^2$ and larger than 6 kg·m/cm$^2$, respectively.

The present invention is a steam turbine blade made of a martensite steel having a 20° C. V-notch impact value, wherein said 20° C. V-notch impact value is larger than a value (y) (kg·m/cm$^2$) calculated by an equation $y=-0.44x+68$, preferably $y=-0.44x+71$, further preferably $y=-0.44x+72$, where (x) is a 20° C. tensile strength (kg/mm$^2$).

It is preferable that the steam turbine blade described above is made of a martensite steel containing C of 0.13–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35; and N of 0.04–0.15%, on the basis of weight.

The present invention is characterized by a steam turbine blade, which is made of a martensite steel containing C of 0.19–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35; and N of 0.04–0.15%, on the basis of weight.

The steam turbine blade described above is characterized by that the matensite steel contains C of 0.25–0.40% and Mo of 1.5–2.0%; or C of 0.19–0.40% and Mo of 3–4%, on the basis of weight.

The present invention is characterized by a steam turbine blade having a blade length above 45 inches for a 3000 rpm turbine or a blade length above 37.5 inches for a 3600 rpm turbine, which is made of a martensite steel containing C of 0.16–0.40%; Si less than 0.5%; Mn less than 1.5%; Ni of 2–3.5%; Cr of 8–13%; at least one kind of Nb and Ta of 0.02–0.3% in total; V of 0.05–0.35; and N of 0.04–0.15%, on the basis of weight.

The present invention is characterized by a steam turbine blade having a blade length above 45 inches for a 3000 rpm turbine or a blade length above 37.5 inches for a 3600 rpm turbine, which is made of a martensite steel containing C of 0.13–0.40%; Si less than 0.5%; Mn less than 1.5%; Ni of 2–3.5%; Cr of 8–13%; at least one kind of Nb and Ta of 0.02–0.3% in total; V of 0.05–0.35; and N of 0.04–0.15%, on the basis of weight, wherein a combination of the amount of C and the amount of Mo falls within a range formed by connecting to points A (0.21%, 1.5%), B (0.15%, 2.5%), C (0.15%, 3.2%) and D (0.25%, 4.0%). Further, it is preferable that the combination of the amount of C and the amount of Mo falls within a range formed by connecting to points E (0.39%, 1.9%), F (0.21%, 2.4%) and G (0.25%, 3.90%).

The present invention is characterized by a steam turbine power generating plant comprising a high pressure turbine, an intermediate pressure turbine and one or two low pressure turbines connected in tandem or cross, wherein blades in a final stage of the low pressure turbine are the steam turbine blades described in any one of the above items.

The present invention is characterized by a steam turbine power generating plant comprising a set of a high pressure turbine and a low pressure turbine and a generator; and a set of an intermediate pressure turbine and a low pressure turbine and a generator, the sets being connected in tandem or cross, wherein blades in a final stage of the low pressure turbines are the steam turbine blades described in any one of the above items.

The present invention is characterized by a low pressure steam turbine comprising a rotor shaft; rotor blades mounted on the rotor shaft; fixed blades for guiding flow of steam to the rotor blades; and a casing holding the fixed blades, wherein the rotor blades in a final stage are the steam turbine blades described in any one of the above items.

The present invention is characterized by a low pressure steam turbine having a rotating speed of 3000 rpm or 3600 rpm, which comprises five stages of the rotor blades symmetrically arranged in both sides, and is of a double flow construction having the rotor blades in the first stages being mounted in a middle portions of the rotor shaft, and the rotor blades in the final stages are the steam turbine blades described in any one of the above items.

It is preferable that the rotor shaft is made of a bainite steel having a 0.02% yield strength at room temperature above 80 kg/mm$^2$ in the central portion of the rotor shaft; 0.2% yield strength above 87.5 kg/mm$^2$ or a tensile strength above 92 kg/mm$^2$; and a FATT below −5° C. or a 20° C. V-notch impact value above 10 kg·m.

It is preferable that the bainite steel is a forged steel containing C of 0.20–0.28%; Si less than 0.15%; Mn less than 0.25%; Ni of 3.25–4.25%; Cr of 1.6–2.5%; Mo of 0.25–0.6%; and V of 0.05–0.20%, on the basis of weight.

In regard to the steam turbine blade in accordance with the present invention, it is preferable that the material required for the steam turbine blade having a blade length above 46 inches for a 3000 rpm turbine or a blade length above 38.5 inches for a 3600 rpm turbine has a 20° C. tensile strength above 147 kg/mm$^2$ and a 0.02% yield strength above 101 kg/mm$^2$.

In regard to the steam turbine blade in accordance with the present invention, an inclination of the blade portion in the width direction is nearly parallel to an axial direction of the rotor shaft at a position of the implanting portion, the top end portion of the blade is inclined to the axial direction preferably from 65 to 85 degrees, further preferably from 70 to 80 degrees.

The steam turbine blade in accordance with the present invention has a blade length above 45 inches for a 3000 rpm turbine or a blade length above 37.5 inches for a 3600 rpm turbine, and it is preferable that the implanting portion is of a fork shape having nine or more prongs for the blade above 45 inch length and seven or more prongs for the blade above 37.5 inch length, or of an inverse Christmas tree shape having four or more projections.

In the steam turbine blade in accordance with the present invention, it is preferable that the width of the implanting portion is 2.1 to 2.5 times as large as the width of the top end of the blade portion.

In the present invention, it is preferable that the steam turbine blade has an erosion preventive shield arranged in the leading side of the top end portion of the blade portion; the implanting portion of a fork type; and holes to insert a pin therein for fixing the blade to the rotor shaft in plural stages, the diameter of the hole being larger in the blade side than the opposite side.

The low pressure turbine has the final stage rotor blade of which the average diameter is above 3520 mm, preferably 3600–3750 mm for the 3000 rpm turbine, and above 2930 mm, preferably 3000–3130 mm for the 3600 rpm turbine.

The low pressure turbine has the final stage rotor blade of which the average diameter is above 2800 mm, preferably 3000–3040 mm for the 3000 rpm turbine, and above 2330 mm, preferably 2400–2530 mm for the 3600 rpm turbine.

The above requirements can be applied to the following invention.

In the present invention, it is preferable that in the steam turbine power generating plant described above, when the steam inlet temperature to the first stage rotor blades of the high pressure turbine and the intermediate pressure turbine or the high and intermediate pressure turbine is within a rage of 538 to 660° C. (538° C., 566° C., 593–605° C., 610–620° C., 620–630° C., 630–640° C.) and the steam inlet temperature to the first stage rotor blades of the low pressure steam turbine is within a rage of 350 to 400° C., the rotor shaft or all of the rotor shaft, the rotor blades, the fixed blades and the inner casing exposed to the above-mentioned steam inlet temperature of the high pressure turbine and the intermediate pressure turbine or the high and intermediate pressure turbine are made of a high strength martensite steel containing Cr of 8 to 13 weight %, and the rotor blades in the first stage or up to the second stage or the third stage among the above components are made of a nickel base alloy.

In the present invention, it is preferable that in a high pressure steam turbine, an intermediate pressure turbine or a high and intermediate pressure integrated steam turbine in which outlet steam from a high pressure side turbine is heated up to a temperature equal to or above an inlet temperature of the high pressure side turbine to be conducted to an intermediate pressure side turbine, the steam turbine comprises a rotor shaft; rotor blades mounted onto the rotor shaft; fixed blades for guiding steam to flow into the rotor blades; and an inner casing for holding the fixed blades, wherein the steam flowing into the first stage of the rotor blades has a temperature of 538 to 660° C. and a pressure above 250 kgf/cm$^2$ (preferably 246 to 316 kgf/cm$^2$) or 170 to 200 kgf/cm$^2$, and the rotor shaft or the rotor shaft and the rotor blades and the fixed blades at least in the first stage are made of a high strength martensite steel having fully annealed martensite structure containing Cr of 8.5 to 13 weight % (preferably 10.5 to 11.5 weight %) of which the 10$^5$ hour creep rupture strength at a temperature corresponding to each of the steam temperatures (538° C., 566° C., 610° C., 625° C., 640° C., 650° C., 660° C.) is above 10 kgf/mm$^2$ (preferably, above 17 kgf/mm$^2$), and the rotor blades in the first stage or up to the second stage or the third stage among the above components are made of a nickel base alloy, and the inner casing is made of a martensite cast steel containing Cr of 8 to 9.5 weight % of which the 10$^5$ hour creep rupture strength at a temperature corresponding to each of the steam temperatures is above 10 kgf/mm$^2$ (preferably, above 17 kgf/mm$^2$).

In the high pressure steam turbine, the intermediate pressure turbine or the high and intermediate pressure integrated steam turbine, in order to cope with the steam temperature of 593–660° C., it is preferable that at least one of the rotor shaft or the rotor blades and the fixed blades in the first stage are made of a high strength martensite steel containing c of 0.05–0.20%; Si less than 0.6%, preferably less than 0.15%; Mn less than 1.5%, preferably 0.05–1.5%; Cr of 8.5–13%, preferably 9.5–13%; Ni of 0.05–1.0%; V of 0.05–0.5%, preferably 0.05–0.35%; at least one kind of Nb and Ta of 0.01–0.20%; N of 0.01–0.1%, preferably 0.01–0.06%; Mo less than 1.5%, preferably 0.05–1.5%; W of 0.1–4.0%, preferably 1.0–4.0%; Co less than 10%, preferably 0.5–10%, B less than 0.03%, preferably 0.0005–0.03%; and Fe above 78%, on the basis of weight. In order to cope with the steam temperature lower than 600–620° C., it is preferable that at least one of the rotor shaft or the rotor blades and the fixed blades in the first stage are made of a high strength martensite steel containing c of 0.1–0.25%; Si less than 0.6%; Mn less than 1.5%; Cr of 8.5–13%; Ni of 0.05–1.0%; V of 0.05–0.5%; W of 0.10–0.65%; at least one kind of Nb and Ta of 0.01–0.20%; Al less than 0.1%; Mo less than 1.5%; N of 0.025–0.1%; and Fe above 80% on the basis of weight. It is preferable that the inner casing is made of a high strength martensite steel containing c of 0.06–0.16%; Si less than 0.5%; Mn less than 1%; Ni of 0.2–1.0%; Cr of 8–12%; V of 0.05–0.35%; at least one kind of Nb and Ta of 0.01–0.15%; N of 0.01–0.8%; Mo less than 1%; W of 1–4%; B of 0.0005–0.003%; and Fe above 85%, on the basis of weight.

It is preferable that the high pressure steam turbine in accordance with the present invention has seven or more stages of the rotor blades, preferably nine or more stages, further preferably nine to twelve stages; a double flow structure in the first stage; and a distance (L) between the centers of bearing of the rotor shaft longer than 5000 mm (preferably, 5100 to 6500 mm). It is preferable that the lengths of the blades from the first stage to the final stage are 25 to 180 mm.

It is preferable that the intermediate pressure steam turbine in accordance with the present invention symmetrically has six or more stages of the rotor blades, preferably six to nine stages; a double flow structure in the first stage disposed in the middle portion of the rotor shaft; and a distance (L) between the centers of bearing of the rotor shaft is longer than 5000 mm (preferably, 5100 to 6500 mm). It is preferable that the lengths of the blades are 60 to 300 mm.

It is preferable that the low pressure steam turbine in accordance with the present invention symmetrically has five or more stages of the rotor blades, preferably more than six stages, further preferably eight to ten stages; a double flow structure in the first stage disposed in the middle portion of the rotor shaft; and a distance (L) between the centers of bearing of the rotor shaft is longer than 6500 mm (preferably, 6600 to 7500 mm). It is preferable that the lengths of the blades are 90 mm in the first stage and the aforementioned length in the final stage.

In the rotor material for the high pressure, the intermediate pressure and the high and intermediate pressure turbines in accordance with the present invention, in order to attain a high high-temperature strength and a high low-temperature toughness and a high fatigue strength as the fully annealed martensite steel, the composition is preferably adjusted so that a Cr equivalent becomes 4 to 8.

$$Cr\ equivalent = Cr + 6Si + 4Mo + 1.5W + 11V + 5Nb - 40C - 30B - 2Mn - 4Ni - 2Co + 2.5Ta$$

It is preferable that the high and intermediate pressure integrated steam turbine in accordance with the present invention has seven or more stages of the high pressure side rotor blades, preferably eight or more stages; five or more stages of the intermediate pressure side rotor blades, preferably six or more stages; and a distance (L) between the centers of bearing of the rotor shaft longer than 6000 mm (preferably, 6100 to 7000 mm). It is preferable that the lengths of the blades are 25 to 200 mm in the high pressure side and 100 to 350 mm in the intermediate pressure side.

The steam turbine blade in accordance with the present invention must be high in tensile strength and at the same time high in high cycle fatigue strength in order to withstand a high centrifugal force and a vibration stress caused by high speed rotation. Therefore, it is preferable that the metallic structure of the blade material is a fully annealed martensite structure because the fatigue strength is largely deteriorated when there exists a harmful δ-ferrite phase.

The component of the steel in accordance with the present invention is necessary to be adjusted so that the δ-ferrite phase is practically not contained by setting the Cr equivalent calculated by the aforementioned equation to a value smaller than 10, preferably 4 to 10.

As the heat treatment of controlling homogeneity in order to obtain the steam turbine long blade having homogeneity and high strength, it is preferable that the material is quenched by heating and holding it at 1000° C. to 1100° C. (preferably, 1000° C. to 1055° C.) for 0.5 to 3 hours after melting and forging and after that rapidly cooling it down to room temperature (particularly, oil quenching is preferable), and then annealed at 540° C. to 620° C., particularly it is preferable to perform twice or more annealing heat treatments of the first annealing of heating and holding the material 540° C. to 570° C., preferably for 1 to 6 hours and after that cooling it down to room temperature and the second annealing of heating and holding the material at 560° C. to 590° C. preferably for 1 to 6 hours and after that cooling it down to room temperature. It is preferable that the temperature of the second annealing is higher than the temperature of the first annealing, particularly by 10 to 30° C., further preferable by 15 to 20° C. It is further preferable to perform cryogenic treatment to cool the material down to the dry-ice temperature or the liquid nitrogen temperature in order to fully decompose the residual austenite phase.

As described above, the low pressure steam turbine blade in the final stage in accordance with the present invention has the blade length above 952.5 mm (37.5 inches), preferably 1016 mm (40 inches) to 1067 mm (42 inches) for the 3600 rpm turbine and the blade length above 1168.4 mm (46 inches), preferably 1219.2 mm (48 inches) to 1270 mm (50 inches) for the 3000 rpm turbine.

The martensite steel contains C above 0.13% in order to obtain high tensile strength and high toughness, but the toughness is decreased when the content of C exceeds 0.4%. Particularly, it is preferable that the content of C is set to a value within the range of 0.13 to 0.40%, 0.19 to 0.40% or 0.25 to 0.40% depending on the relationship with the content of Mo.

Si is a deoxidizing agent and Mn is a desulfurizing and deoxidizing agent, and the both are added to steel when the steel is melted, and a small amount of Si and Mn addition is effective. Si is a δ-ferrite forming element, and a large amount of the Si addition produces δ-ferrite to decrease the fatigue strength and the toughness. Therefore, it is preferable that an amount of Si addition is less than 0.5%, preferably less than 0.25%. In a case of using the carbon vacuum deoxidizing method or the electro-slug melting method, no addition of Si is preferable because there is no need to add Si. Particularly, the content of Si is preferably less than 0.10, further preferable less than 0.05%.

A small amount of Mn addition increases the toughness though a large amount of Mn addition decreases the toughness, and accordingly the content of Mn is preferably less than 1.5%. Particularly, although Mn is effective as a deoxidizing agent, the content of Mn is less than 0.4% from the view point of improving the toughness, preferably 0.05 to 0.2%.

Cr increases corrosion resistance and tensile strength, but forms δ-ferrite structure when it is added above 13%. Since the corrosion resistance and the tensile strength are insufficient when the content of Cr is less than 8%, it is preferable that the content of Cr is 10.5 to 12.5 particularly from the view point of the strength, further preferable 11 to 12%.

Mo is effective in increasing the tensile strength by a solution treated reinforce and a precipitating reinforce effects. Since the effect of improving the tensile strength is insufficient when the content of Mo is below 1.5% and the δ-ferrite structure is formed when the content of Mo exceeds 4%, it is preferable that the content of Mo is 1.5 to 2.0%, 2.0 to 3.5%, 3 to 4% depending on the content of C. In addition, since W also has the same effect as that of Mo, the content of Mo may be less than 2% by replacing part of Mo by W in order to improve the tensile strength.

V and Nb have an effect to increase the tensile strength and to improve the toughness by precipitating carbide. Since the effect is insufficient when V is less than 0.05% and Nb is less than 0.02%, it is preferable that V is less than 0.35% and Nb is less than 0.3% from the view point of avoiding the δ-ferrite formation. Particularly, it is preferable that the content of V is 0.15 to 0.30%, further preferable 0.25 to 0.30%, and the content of Nb is 0.10 to 0.20%, further preferable 0.12 to 0.18%. Ta may be similarly added instead of Nb, and the amount in the complex addition may be equal to the above content in total.

Ni has increases the low-temperature toughness and also has an effect of preventing the δ-ferrite formation. This effect is insufficient when the content of Ni is less than 2%, and is saturated when the addition exceeds 3.5%. Particularly, it is preferable that the content of Ni is 2.6 to 3.2%.

N improves the tensile strength and has an effect of preventing δ-ferrite formation, but the effect is insufficient when the content of N is less than 0.04% and the toughness is decreased when the content exceeds 0.15%. Particularly, an excellent property can be attained when the content of N is within the range of 0.06 to 0.10%.

Since reducing contents of P and S has an effect to increase the low-temperature toughness without deteriorating the tensile strength, it is preferable that the contents are reduced as low as possible. It is preferable from the viewpoint of improving the low-temperature toughness that the content of P is less than 0.015% and the content of S is less than 0.015%. Particularly, it is preferable that the content of P is less than 0.010% and the content of S is less than 0.010%.

Since reducing contents of Sb, Sn and As also has an effect to increase the low-temperature toughness, it is preferable that the contents are reduced as low as possible. However, from the viewpoint of the level of the steel manufacturing technology at present, the content of Sb is limited less than 0.0015%, the content of Sn is limited less than 0.01% and the content of As is limited less than 0.02%. Particularly, it is preferable that the content of Sb is less than 0.001%, the content of Sn is less than 0.005% and the content of As is less than 0.01%.

Further, in the present invention, it is preferable that the martensite steel contains one kind or each of combinations of two kinds, three kinds or four kinds of MC metal carbide forming elements such as Ti, Zr, Hf, Ta and so on less than 0.5% in total. In addition, in order to improve the plasticity workability and the toughness, the martensite steel contains at least one kind of Al, Ca, Mg, Y, and rear earth elements less than 0.2% in total.

As the heat treatment of the material in accordance with the present invention, it is preferable that the fully annealed martensite structure is obtained by uniformly heating it at a temperature high enough to change it to fully austenite phase from 1000° C. at the minimum to 1100° C. at the maximum and after that rapidly cooling it down to room temperature (preferably, oil quenching), and then annealed the material by heating and holding the material 550° C. to 570° C. and after that cooling it down (the first annealing) and heating and holding the material 560° C. to 680° C. and after that cooling it down (the second annealing). It is preferable that the temperature of the second annealing is higher than the temperature of the first annealing.

It is preferable that an erosion preventive layer made of a Co base alloy is attached to a top end leading edge portion of the rotor blade in the final stage. It is preferable that a plate made of the Co base alloy containing Cr of 25 to 30%, W of 1.5 to 7.0% and C of 0.5 to 1.5% on the weight basis is welded to the top end leading edge portion of the rotor blade through electron beam welding or TIG welding.

(2) It is preferable that the rotor shaft of the high pressure, the intermediate pressure or the high and intermediate pressure integrated type steam turbine in accordance with the present invention has an overlay weld layer made of a Cr—Mo low-alloy steel having high bearing property formed on the journal portion. The overlay weld layer is composed of plural layers from 3 layers to 10 layers formed by welding materials, and contents of Cr in the welding materials are successively reduced from the first layer to a layer between the second layer to the fourth layer, and the layers from the fourth layer on are welded using welding materials made of steels having the same Cr content, and the Cr content in the welding material used for welding the first layer is less than the Cr content in the base material by 2 to 6 weight %, and the Cr contents in the welded layers from the fourth layer on are set to 0.5 to 3 weight % (preferably, 1 to 2.5 weight %).

In the present invention, in order to improve the bearing property of the journal portion, the overlay weld layer is preferable from the viewpoint of the highest safety. It is also possible to employ a shrink-in structure of a sleeve made of a low-alloy steel containing Cr of 1 to 3 weight %.

Number of the welding layers for gradually decreasing the Cr content is preferably 3 or more, but the additional effect can not be obtained if number of the layers is increased above 10 or more. For example, the thickness of the overlay weld layer is required to be approximately 18 mm in the final finishing. In order to forming the overlay weld layer having such a thickness, it is preferable that the overlay weld layer is composed of at least five layers excluding a margin for the final finishing by cutting. It is preferable that the layers from the third layer on have mainly have an annealed martensite structure and precipitation of carbide. Particularly, it is preferable that the material of the welded layers from the fourth layer on contains C of 0.01 to 0.1%, Si of 0.3 to 1%, Mn of 0.3 to 1.5%. Cr of 0.5 to 3%, Mo of 0.1 to 1.5% on the weight basis, and the remainder of Fe.

(3) It is preferable to use a martensite group heat resistant steel for constructing the components of the high pressure steam turbine, the intermediate pressure steam turbine and the high and intermediate pressure steam turbine in accordance with the present invention such as a valve box of an inner casing control valve, a valve box of a combined reheater valve, a main steam lead pipe, a main steam inlet pipe, a reheater inlet pipe, a nozzle box of the high pressure turbine, a first stage diaphragm of the intermediate turbine, a main steam inlet flange and an elbow of the high pressure turbine, and a main steam stop valve.

The material used for constructing components of an ultra-super critical pressure turbine for an operating pressure above 250 kgf/cm$^2$ such as a high pressure, an intermediate pressure or a high and intermediate pressure inner casing, and casings of a main steam stop valve and a control valve is required to have a 10⁵ hour creep rupture strength at the operating temperature above 9 kgf/mm² and a room temperature impact absorption energy above 1 kgf-m.

It is preferable that the inner casing material is a martensite cast steel containing C of 0.06 to 0.16% (preferably 0.09 to 0.14%), N of 0.01 to 0.1% (preferably 0.02 to 0.06%), Mn less than 1% (preferably 0.4 to 0.7%), Si-free or Si less than 0.5% (preferably 0.1 to 0.4%), V of 0.05 to 0.35% (preferably 0.15 to 0.25%), Nb less than 0.15% (preferably 0.02 to 0.1%), Ni of 0.2 to 1% (preferably 0.4 to 0.8%), Cr of 8 to 12% (preferably 8 to 10%, further preferably 8.5 to 9.5%), W of 1 to 3.5%, Mo less than 1.5% (preferably 0.4 to 0.8%) on the weight basis and the remainder of Fe.

It is preferable that the content of W is 1.0 to 1.5% for 620° C., 1.6 to 2.0% for 630° C., 2.1 to 2.5% for 640° C., 2.6 to 3.0% for 650° C., and 3.1 to 3.5% for 660° C.

Addition of Ta, Ti and Zr has an effect to increase the toughness, and the effect can be sufficiently attained by adding Ta less than 0.15%, Ti less than 0.1% and Zr less than 0.1% solely or in complex. When Ta is added above 0.1%, the addition of Nb can be omitted.

(4) It is preferable that the rotor shaft of the low pressure steam turbine is made of a low-alloy steel having fully annealed bainite structure containing C of 0.2 to 0.3%, Si less than 0.15%, Mn less than 0.25%, Ni of 3.25 to 4.25%, Cr of 1.6 to 2.5%, Mo of 0.25 to 0.6%, V of 0.05 to 0.25% and Fe more than 92.5% on the basis of weight, and is manufactured through the method similar to that of the rotor shaft of the high pressure and the intermediate pressure turbines. Particularly, it is preferable that the low-alloy steel contains Si less than 0.05%, Mn less than 0.1% and the other impurities such as P, S, As, Sb, Sn and so on less than 0.025% in total, preferably less than 0.015%, so as to suppress the impurities as low as possible by using a material produced though a super-cleaned process using a raw material containing less impurities. It is preferable that the low-alloy steel contains P and S each less than 0.010%, Sn and As each less than 0.005% and Sb less than 0.001%. The rotor shaft has a close relationship with the rotor blade in the final stage made of the martensite steel having the above mentioned specified length corresponding to the rotation speed. The rotor shaft in accordance with the present invention is as to be described later in the embodiment. It is preferable that the rotor shaft in accordance with the present invention with a center hole has a fork shape implanting portion, and the rotor shaft without the center hole has an inverse Christmas tree shape implanting portion.

(5) It is preferable that the turbine blades other than in the final stage and the nozzles of the low pressure turbine are made of a fully annealed martensite steel containing C of 0.05 to 0.2%, Si of 0.1 to 0.5%, Mn of 0.2 to 1.0%, Cr of 10 to 13%, and Mo of 0.04 to 0.2%.

(6) It is preferable that the inner and the outer casings of the low pressure turbine are made of a carbon cast steel containing C of 0.2 to 0.3%, Si of 0.3 to 0.7%, and Mn less than 1%.

(7) It is preferable that the casing of the main steam stop valve and the casing of the steam control valve are made of a fully annealed martenasire steel containing C of 0.1 to 0.2%, Si of 0.1 to 0.4%, Mn of 0.2 to 1.0%, Cr of 8.5 to 10.5%, Mo of 0.3 to 1.0%, W of 1.0 to 3.0%, V of 0.1 to 0.3%, Nb of 0.03 to 0.1%, N of 0.03 to 0.08%, and B of 0.0005 to 0.003%.

(8) It is preferable that the outer casings of the high pressure turbine, the intermediate turbine and the high and intermediate turbine are made of a cast steel having bainite structure and containing C of 0.10 to 0.20%, Si of 0.05 to 0.6%, Mn of 0.1 to 1.0%, Ni of 0.1 to 0.5%, Cr 1 to 2.5%, Mo 0.5 to 1.5%, V of 0.1 to 0.35%, and preferably Al less than 0.025%, at least one of B of 0.0005 to 0.004% and Ti of 0.05 to 0.2%. Particularly, is preferable that the outer casings the cast steel containing C of 0.10 to 0.18%, Si of 0.20 to 0.60%, Mn of 0.20 to 0.50%, Ni of 0.1 to 0.5%, Cr of 1.0 to 1.5%, Mo of 0.9 to 1.2%, V of 0.2 to 0.3%, Al of 0.001 to 0.005%, Ti of 0.045 to 0.10%, and B of 0.0005 to 0.0020%. It is further preferable that the ratio Ti/Al is 0.5 to 10.

(9) Instead of the martensite steel described above, the blades in the first stage of the high pressure turbine, the intermediate pressure turbine and the high and intermediate pressure turbine (the high pressure side and the intermediate pressure side) under a steam temperature of 625 to 650° C., preferably the blades up to the second stage or the third stage of the high pressure turbine and the high pressure side of the high and intermediate pressure turbine and blades up to the second stage of the intermediate pressure turbine and the intermediate pressure side of the high and intermediate pressure turbine, may be made of a Ni base alloy containing C of 0.03 to 0.20% (preferably 0.03 to 0.15%), Cr of 12 to 20%, Mo of 9 to 20% (preferably 12 to 20%), Co less than 12% (preferably 5 to 12%), Al of 0.5 to 1.5%, Ti of 1 to 3%, Fe less than 5%, Si less than 0.3%, Mn less than 0.2%, B of 0.003 to 0.015%, in addition to the above compositions, at least one kind of Mg less than 0.1%, rare earth element less than 0.5% and Zr less than 0.5%, on the weight basis. The content of the above additional compositions include 0%. The blades are solution treated and aging treated after being forged.

DESCRIPTION OF THE PREFERRED EMBODIMENTS

[Embodiment 1]

Figure 1:
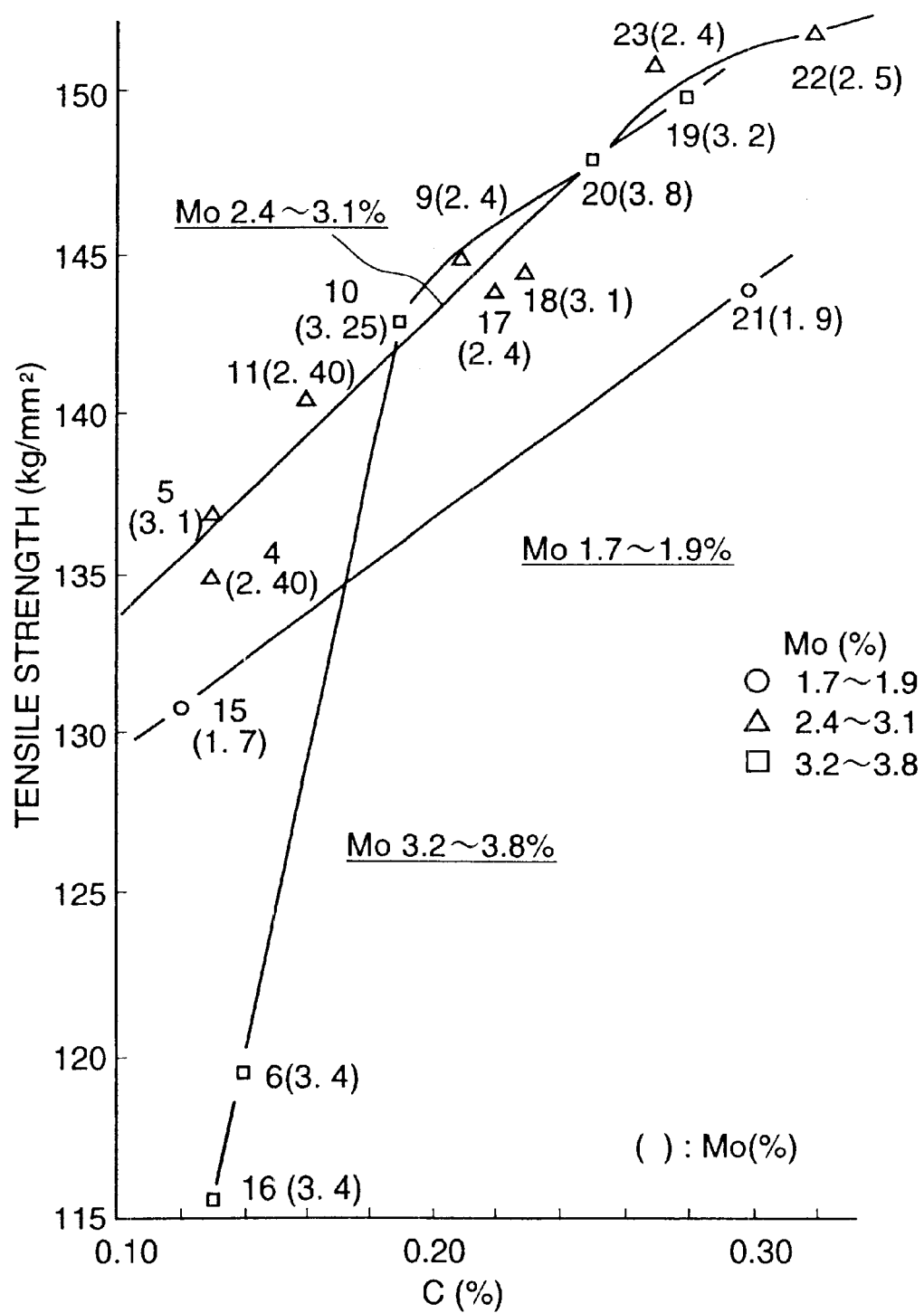
FIG. 1 is a graph showing the relationship between tensile strength and carbon content C (%).

Table 1 shows the chemical compositions (weight %) of the 12% Cr steels relating to the materials for the long blades of steam turbine, and wherein the remainder is Fe. The samples 150 kg for each were separately melted by vacuum arc, and heated up to 1150° C. and forged to be prepared as the test samples. The samples No. 1 and No. 15 were heated to 1000° C. and held for 1 hour and after that cooled down to room temperature through oil quenching, and then heated to 570° C. and held for 2 hours and after that cooled down to room temperature by air cooling. The sample No. 2 was heated to 1050° C. and held for 1 hour and after that cooled down to room temperature through oil quenching, and then heated to 570° C. and held for 2 hours and after that cooled down to room temperature by air cooling. The samples No. 3 to No. 11 and No. 16 to No. 19 were heated to 1050° C. and held for 1 hour and after that cooled down to room temperature through oil quenching. The samples No. 12 to No. 14 and No. 20 and No. 21 were heated to 1075° C. and held for 1 hour, and after that cooled down to room temperature through oil quenching. Then, the samples were heated to 560° C. (low temperature annealing) and held for 2 hours and after that cooled down to room temperature by air cooling (first annealing), and further heated to 580° C. (high temperature annealing) and held for 2 hours and after that cooled down to room temperature by air cooling (second annealing). The samples No. 22 and No. 23 were heated to 1075° C. and held for 1 hour, and after that cooled down to room temperature through oil quenching, and then performed cryogenic treatment to cool down to the liquid nitrogen temperature, and further heated to 570° C. and held for 2 hours and after that cooled down to room temperature by air cooling. All the samples had the fully annealed martensite structure.

In Table 1, the samples No. 3 to No. 7 and No. 16 are samples for comparison, and the samples No. 8 to No. 15 and No. 17 to No. 23 are materials in accordance with the present invention, and the samples No. 1 and No. 2 are materials for long blades presently in use.

Table 2 shows mechanical properties at room temperature (20° C.) of these samples. It was verified that the materials No. 9, 10, 13, 14, 17 to 23 in accordance with the present invention satisfy the tensile strength (above 143 kgf/mm$^2$) and the low-temperature toughness (20° C. V-notch Charpy impact value above 4 kgf-m/cm$^2$) required for the material of the long blades having a blade length above 46 inches for the 3000 rpm steam turbine. In this table, the upper rows in the samples No. 1 to No. 11, No. 12 to No. 14 and No. 20, No. 21 indicate values for high temperature annealed materials, and the lower rows in the samples No. 12 to No. 14 indicate values for low temperature materials, and the lower rows in the samples No. 22 and No. 23 indicate values for cryogenic treated materials.

On the other hand, the samples No. 1, No. 6 and No. 16 are too low in the tensile strength and the impact value to be used for the material of the long blades for the steam turbine. The sample No. 2 is low in the tensile strength and the toughness.

The samples No. 3, No. 4, No. 5 and No. 7 have the impact value above 3.8 kgf-m/cm$^2$ and the tensile strength above 28.5 kgf/mm$^2$, and satisfy the requirement of the long blades having a blade length above 43 inches.

TABLE 1

| No. | C | Si | Mn | Cr | Ni | Mo | W | V | Nb | N | Mo/C |
|---|---|---|---|---|---|---|---|---|---|---|---|
| 1 | 0.12 | 0.15 | 0.75 | 11.5 | 2.60 | 1.70 | — | 0.36 | — | 0.03 | 14.2 |
| 2 | 0.28 | 0.28 | 0.71 | 11.6 | 0.73 | 1.10 | 1.12 | 0.21 | — | 0.04 | 3.9 |
| 3 | 0.14 | 0.04 | 0.16 | 11.4 | 2.70 | 2.10 | — | 0.26 | 0.08 | 0.06 | 15.0 |
| 4 | 0.13 | 0.04 | 0.15 | 11.5 | 2.50 | 2.40 | — | 0.28 | 0.10 | 0.05 | 18.5 |
| 5 | 0.13 | 0.08 | 0.15 | 11.4 | 2.65 | 3.10 | — | 0.25 | 0.11 | 0.06 | 23.9 |
| 6 | 0.14 | 0.04 | 0.17 | 11.4 | 2.81 | 3.40 | — | 0.26 | 0.10 | 0.06 | 24.3 |
| 7 | 0.14 | 0.04 | 0.15 | 11.5 | 2.60 | 2.30 | — | 0.27 | 0.10 | 0.07 | 16.4 |
| 8 | 0.15 | 0.04 | 0.15 | 11.4 | 2.71 | 2.10 | — | 0.26 | 0.13 | 0.06 | 14.0 |
| 9 | 0.21 | 0.04 | 0.15 | 11.5 | 2.51 | 2.39 | — | 0.27 | 0.10 | 0.09 | 11.4 |
| 10 | 0.19 | 0.04 | 0.14 | 11.5 | 2.60 | 3.25 | — | 0.26 | 0.11 | 0.08 | 17.1 |
| 11 | 0.16 | 0.04 | 0.17 | 11.4 | 2.61 | 2.40 | — | 0.26 | 0.10 | 0.06 | 15.0 |
| 12 | 0.18 | 0.05 | 0.15 | 11.92 | 2.81 | 2.37 | — | 0.24 | 0.16 | 0.06 | 13.2 |
| 13 | 0.20 | 0.03 | 0.16 | 12.04 | 2.83 | 2.41 | — | 0.25 | 0.16 | 0.076 | 12.1 |
| 14 | 0.19 | 0.04 | 0.15 | 11.98 | 2.83 | 2.41 | — | 0.26 | 0.16 | 0.09 | 11.3 |
| 15 | 0.12 | 0.15 | 0.75 | 11.5 | 2.60 | 1.7 | — | 0.36 | 0.10 | 0.03 | 14.2 |
| 16 | 0.13 | 0.04 | 0.16 | 11.4 | 2.70 | 3.4 | — | 0.26 | 0.13 | 0.06 | 26.2 |
| 17 | 0.22 | 0.04 | 0.15 | 11.5 | 2.50 | 2.4 | — | 0.28 | 0.10 | 0.09 | 10.9 |
| 18 | 0.23 | 0.05 | 0.15 | 11.4 | 2.65 | 3.1 | — | 0.25 | 0.11 | 0.06 | 13.5 |
| 19 | 0.28 | 0.04 | 0.15 | 11.5 | 2.61 | 3.2 | — | 0.25 | 0.13 | 0.09 | 11.4 |
| 20 | 0.25 | 0.04 | 0.15 | 11.5 | 2.81 | 3.8 | — | 0.26 | 0.15 | 0.07 | 15.2 |
| 21 | 0.30 | 0.04 | 0.15 | 11.4 | 2.55 | 1.9 | — | 0.24 | 0.10 | 0.08 | 6.3 |
| 22 | 0.32 | 0.04 | 0.15 | 12.2 | 2.92 | 2.5 | — | 0.25 | 0.20 | 0.07 | 7.8 |
| 23 | 0.27 | 0.04 | 0.15 | 11.3 | 2.45 | 2.4 | — | 0.25 | 0.21 | 0.08 | 8.9 |

TABLE 2

| Sample No. | Tensile strength (kgf/mm$^2$) | Elongation (%) | Contraction (%) | Impact Value (kgf-m/cm$^2$) |
|---|---|---|---|---|
| 1 | 114.4 | 19.0 | 60.1 | 8.0 |
| 2 | 114.6 | 18.6 | 59.7 | 1.2 |
| 3 | 132.5 | 21.0 | 67.1 | 5.2 |
| 4 | 134.9 | 20.8 | 66.8 | 4.8 |
| 5 | 137.0 | 18.5 | 59.8 | 3.8 |
| 6 | 118.7 | 21.1 | 67.3 | 5.2 |
| 7 | 133.5 | 20.1 | 60.4 | 5.1 |
| 8 | 136.0 | 20.5 | 67.0 | 5.2 |
| 9 | 144.9 | 20.9 | 66.5 | 4.8 |
| 10 | 143.0 | 20.4 | 66.5 | 5.0 |
| 11 | 140.5 | 20.1 | 60.4 | 5.3 |
| 12 | 131.6 | 16.3 | 64.5 | 9.7 |

TABLE 2-continued

| Sample No. | Tensile strength (kgf/mm$^2$) | Elongation (%) | Contraction (%) | Impact Value (kgf-m/cm$^2$) |
| --- | --- | --- | --- | --- |
|  | 137.2 | 15.3 | 66.0 | 8.1 |
| 13 | 136.3 | 15.8 | 62.1 | 8.0 |
|  | 141.7 | 14.8 | 63.1 | 6.9 |
| 14 | 138.1 | 14.3 | 57.5 | 6.9 |
|  | 143.8 | 15.0 | 61.5 | 4.9 |
| 15 | 131.5 | 19.0 | 60.1 | 8.0 |
| 16 | 115.5 | 20.0 | 58.5 | 3.2 |
| 17 | 144.0 | 20.8 | 66.8 | 5.6 |
| 18 | 144.5 | 18.5 | 59.8 | 6.3 |
| 19 | 149.8 | 18.8 | 60.2 | 5.8 |
| 20 | 148.0 | 19.1 | 61.5 | 6.3 |
|  | 151.3 | 17.5 | 60.1 | 6.0 |
| 21 | 144.2 | 18.2 | 61.2 | 7.0 |
|  | 147.2 | 16.2 | 59.8 | 7.2 |
| 22 | 152.1 | 17.8 | 58.9 |  |
|  | 150.3 | 20.9 | 61.7 | 6.8 |
| 23 | 151.1 | 18.2 | 62.6 | 6.9 |
|  | 149.8 | 21.5 | 63.2 | 7.3 |

FIG. 1 is a graph showing the relationship between tensile strength and carbon content. As shown in the figure, the effect of carbon content on the tensile strength is largely different depending on molybdenum content. When the molybdenum content is within a range of 1.7 to 3.1%, the tensile strength is increased as the carbon content is increased. Although the tensile strength is 130 to 138 kg/mm$^2$ when the C content is around 0.13%, the tensile strength is 142 to 145 kg/mm$^2$ in a rage of 0.15 to 0.23%, that is, the tensile strength higher than 140 kg/mm$^2$ can be attained. Further, when the C content is 0.24 to 0.32%, the tensile strength of 152 kg/mm$^2$ higher than 145 kg/mm$^2$ can be attained. In addition, in the cases where Mo content is above 3.2%, it is possible to obtain the tensile strength higher than 135 kg/mm$^2$ when the C content is above 0.17%, and the tensile strength higher than 140 kg/mm$^2$ when the C content exceeds 0.18%, and the tensile strength higher than 145 kg/mm$^2$ when the C content is above 0.21%.

Figure 2:
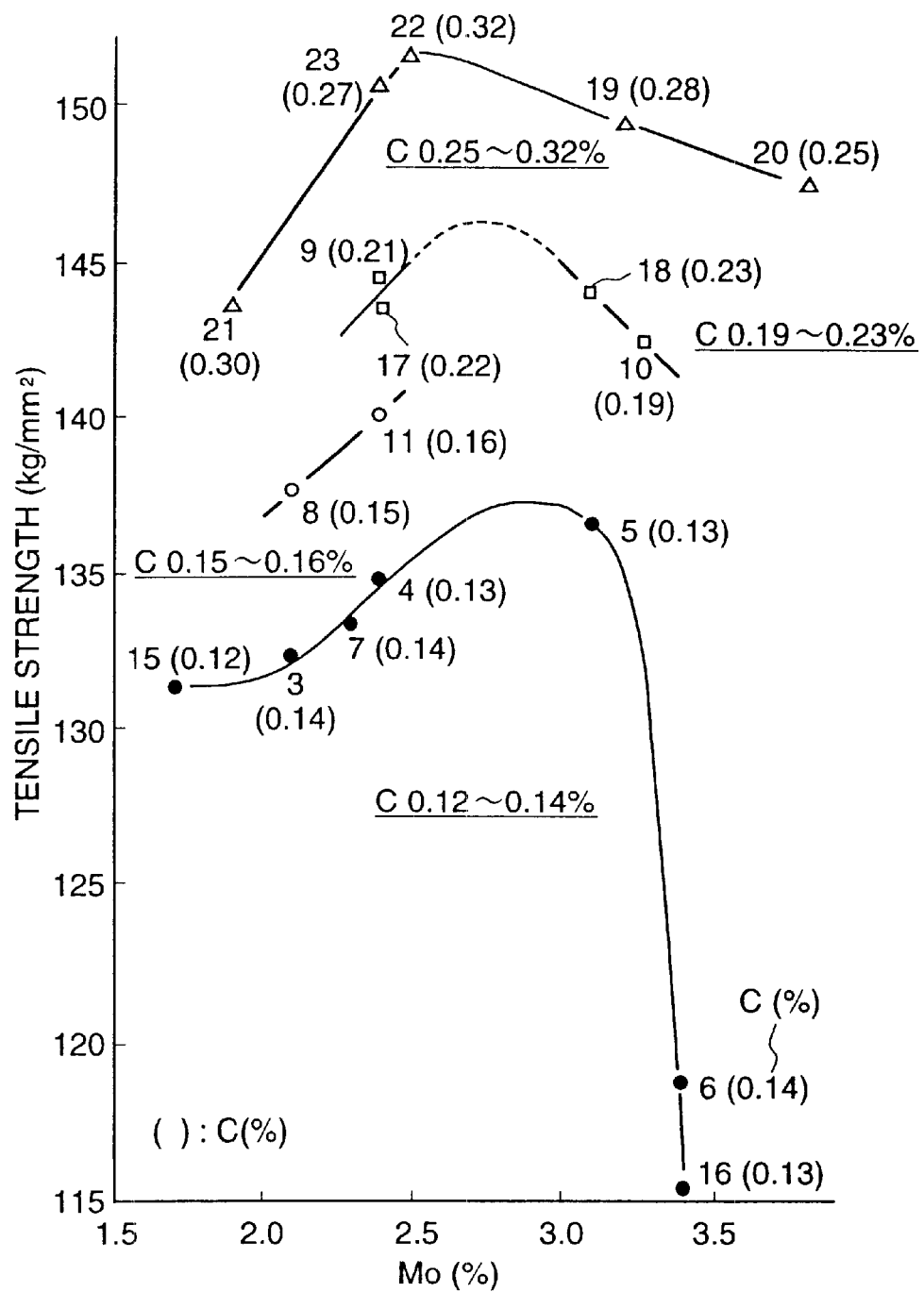
FIG. 2 is a graph showing the relationship between tensile strength and molybdenum content Mo (%).

FIG. 2 is a graph showing the relationship between tensile strength and molybdenum content. As shown in the figure, the tensile strength is largely increased as the molybdenum content and the carbon content are increased. In the case where the C content is 0.13 to 0.14%, it is possible to obtain the high tensile strength of 132 to 135 kg/mm$^2$ when the Mo content is 2.0 to 3.2%. Further, in the case where the C content is 0.15 to 0.16%, it is possible to obtain the tensile strength above 137 kg/mm$^2$ when the Mo content is above 2.0%, and the tensile strength higher than 140 kg/mm$^2$ when the Mo content is 2.4 to 4%. Further, in the case where the C content is 0.19 to 0.23%, it is possible to obtain the tensile strength above 140 kg/mm$^2$ when the Mo content is 2.0 to 3.5%, and particularly the tensile strength higher than 142 kg/mm$^2$ can be obtained when the Mo content is 2 to 3.2%. Furthermore, the very high tensile strength higher than 145 kg/mm$^2$ can be obtained when the Mo content is 2.4 to 3.1%. Therein, the reason why data on the samples No. 12 to No. 14 is not shown in the figure is that these samples are different in the quenching temperature and in the Cr content from the other samples. Further, by increasing the C content to 0.25 to 0.32%, it is possible to obtain the higher tensile strength above 145 kg/mm$^2$, that is, 147 to 152 kg/mm$^2$ when the Mo content is 2 to 4%. Particularly, the tensile strength above 148 kg/mm$^2$ can be obtained when the Mo content is 2.2 to 3.8%.

Figure 3:
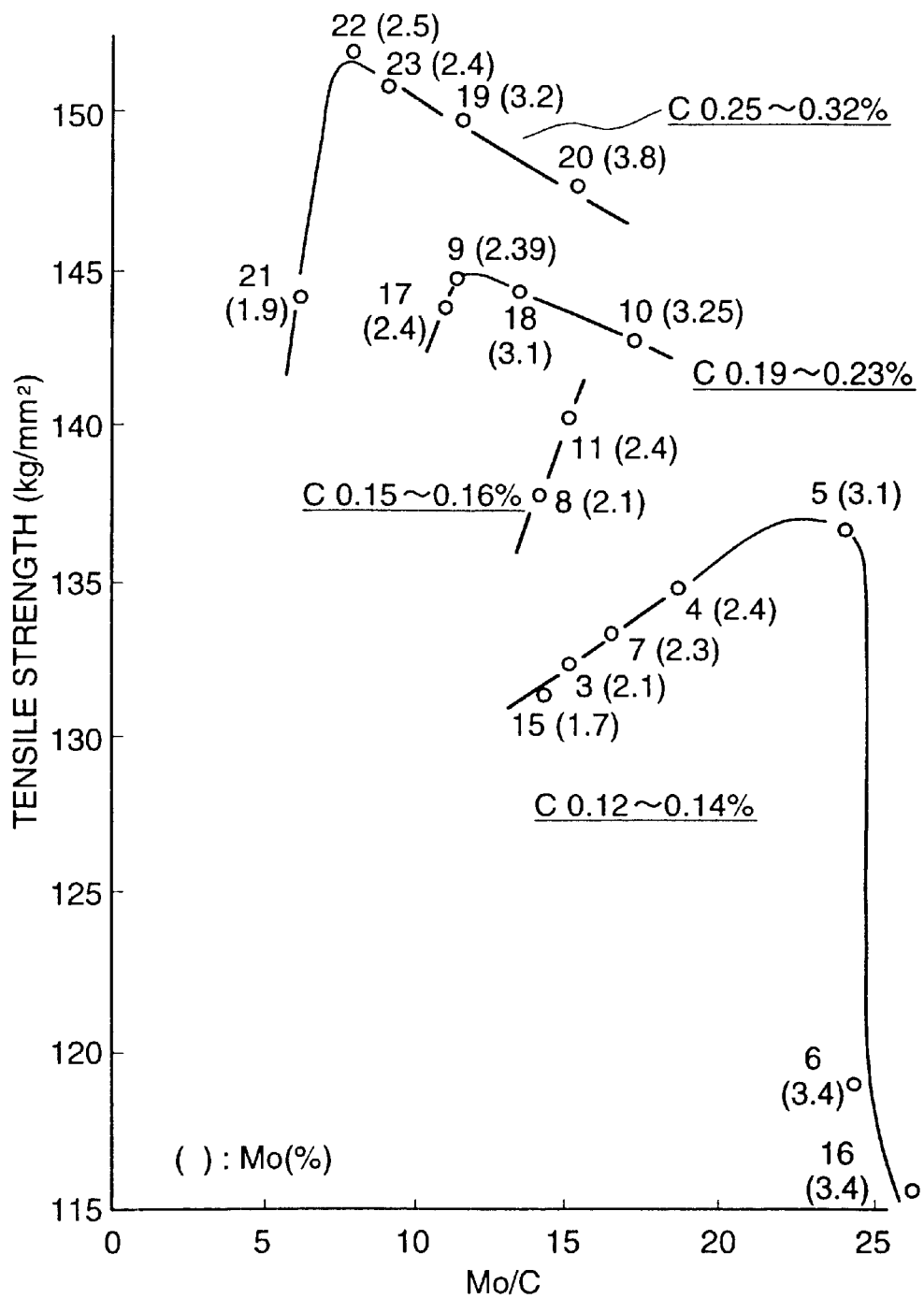
FIG. 3 is a graph showing the relationship between tensile strength and ratio of molybdenum content to carbon content (Mo/C).

FIG. 3 is a graph showing the relationship between tensile strength and ratio of molybdenum content to carbon content (Mo/C). In the case where the C content is as low as 0.12 to 0.14%, it is possible to obtain the tensile strength above 128.5 kg/mm$^2$ when the ratio of molybdenum content to carbon content (Mo/C) is within a range of 10 to 24. Further, in the case where the C content is 0.19 to 0.22%, the tensile strength higher than 140 kg/mm$^2$ can be obtained when the ratio (Mo/C) is within a range of 5 to 22. Particularly, the tensile strength of 142 to 145 kg/mm$^2$ can be obtained when the ratio (Mo/C) is within a range of 8 to 20. Furthermore, in the case where the C content is 0.25 to 0.32%, it is possible to obtain the tensile strength above 145 kg/mm$^2$ when the ratio (Mo/C) is within a range of 6.5 to 20, and particularly, it is possible to obtain the tensile strength 148 to 152 kg/mm$^2$ when the ratio (Mo/C) is within a range of 7 to 15.

Figure 4:
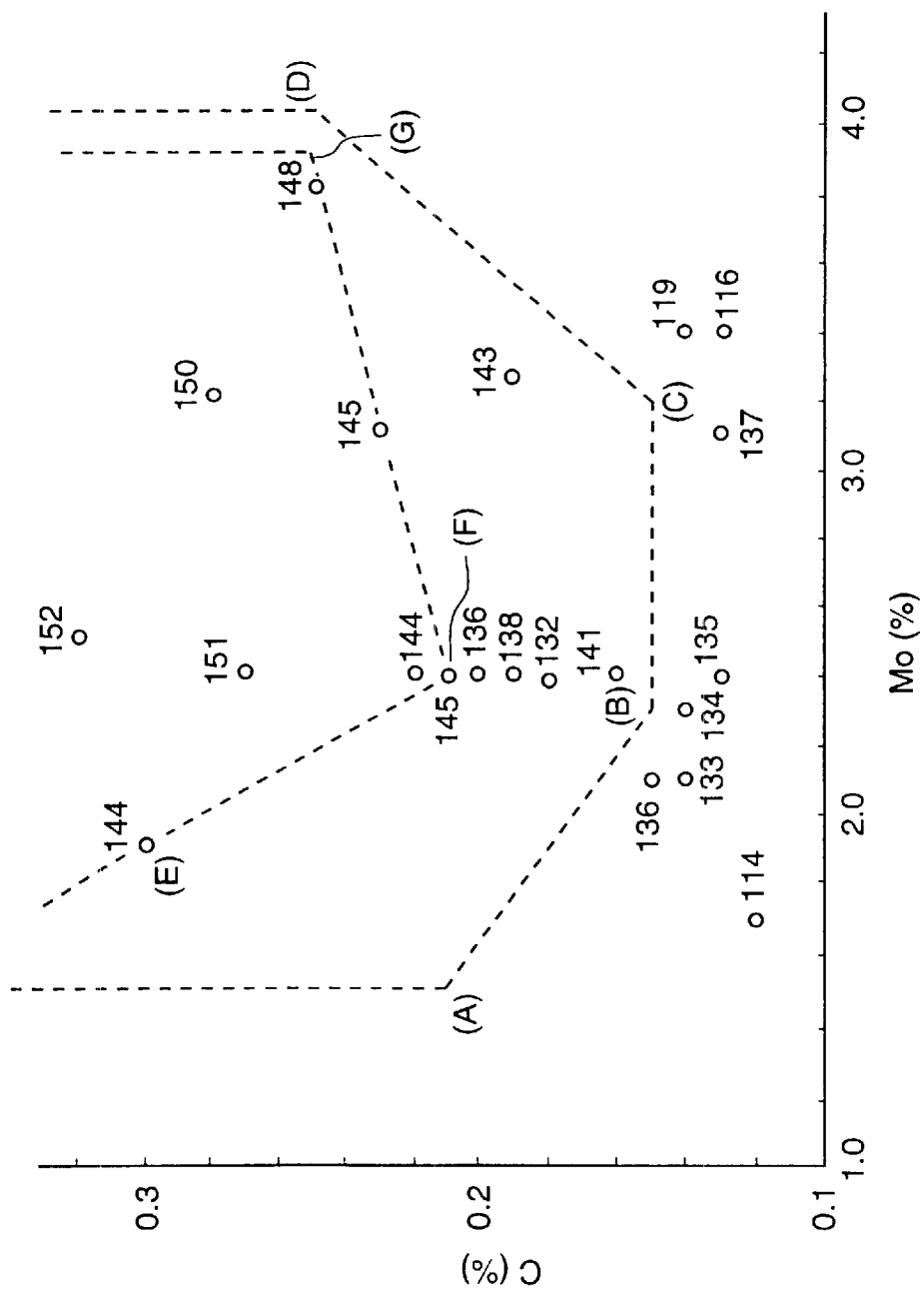
FIG. 4 is a graph showing the relationship between carbon content and molybdenum content.

FIG. 4 is a graph showing the relationship between carbon content and molybdenum content. As described above, the tensile strength varies depending on the relationship between the carbon content and the molybdenum content. Therefore, as shown in the figure, the range capable of obtaining the tensile strength above 140 kg/mm$^2$ or 136 kg/mm$^2$ and the impact value above 8 kg·m/cm$^2$ is preferably within a range formed by connecting to points A (0.21%, 1.5%), B (0.15%, 2.5%), C (0.15%, 3.2%) and D (0.25%, 4.0%). Further, the range capable of obtaining the tensile strength above 145 kg/mm$^2$ is preferably within a range formed by connecting to points E (0.3%, 1.9%), F (0.21%, 2.4%) and G (0.25%, 3.90%).

Figure 5:
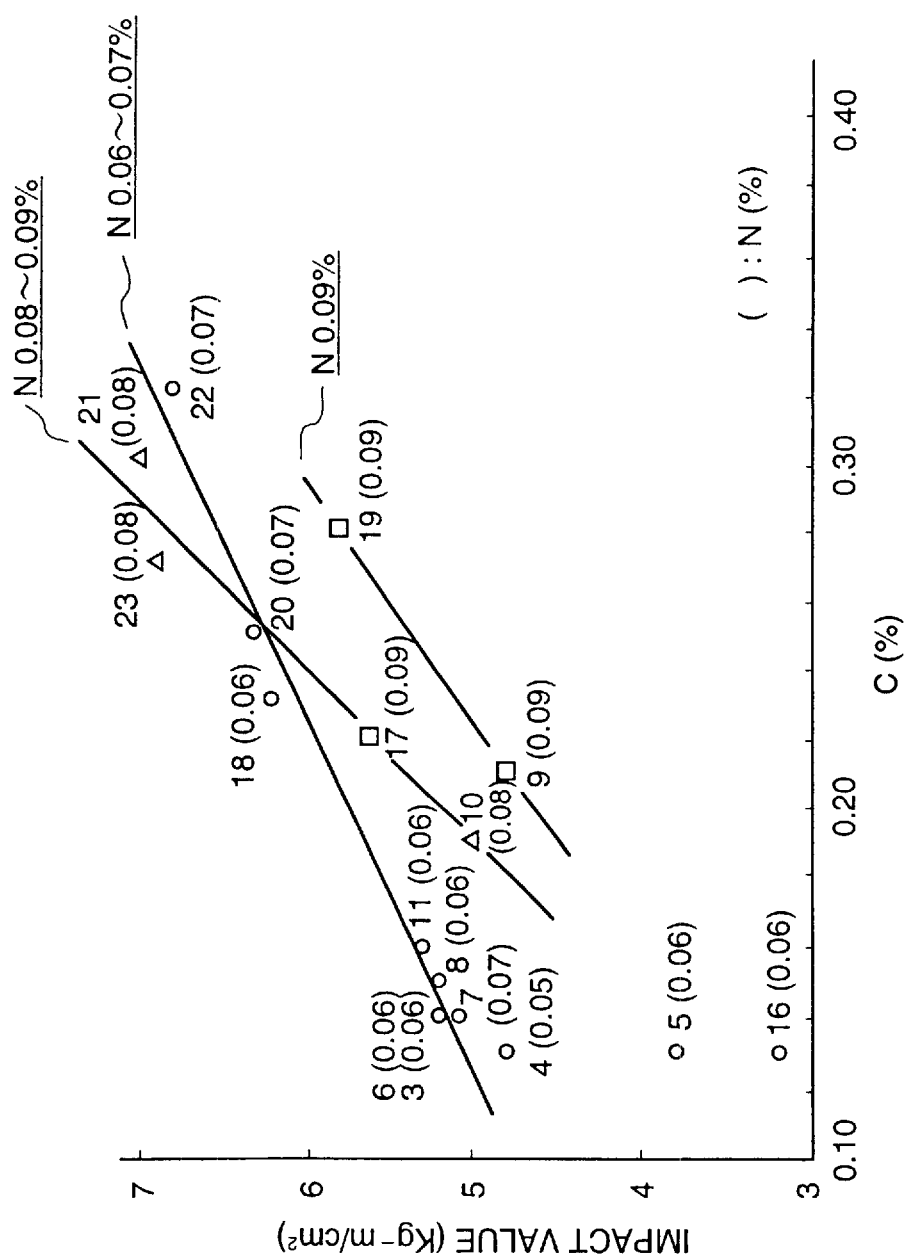
FIG. 5 is a graph showing the relationship between impact value and carbon content C (%).

FIG. 5 is a graph showing the relationship between impact value and carbon content. As shown in the figure, the impact value increases as the C content is increased. The trend is largely affected by the N content. In the case where the N content is 0.06 to 0.07%, the impact value above 5 kg·m/cm$^2$ can be obtained by setting the C content to a value above 0.13%, and the impact value above 6 kg·m/cm$^2$ can be obtained by setting the C content to a value above 0.23%. In the case where the N content is 0.08 to 0.09%, the impact value above 5 kg·m/cm$^2$ can be obtained by setting the C content to a value above 0.19%, and the impact value above 6 kg·m/cm$^2$ can be obtained by setting the C content to a value above 0.24%. In the case where the N content is 0.09%, the impact value above 5 kg·m/cm$^2$ can be obtained by setting the C content to a value above 0.23%, and the impact value above 6 kg·m/cm$^2$ can be obtained by setting the C content to a value above 0.30%.

Figure 6:
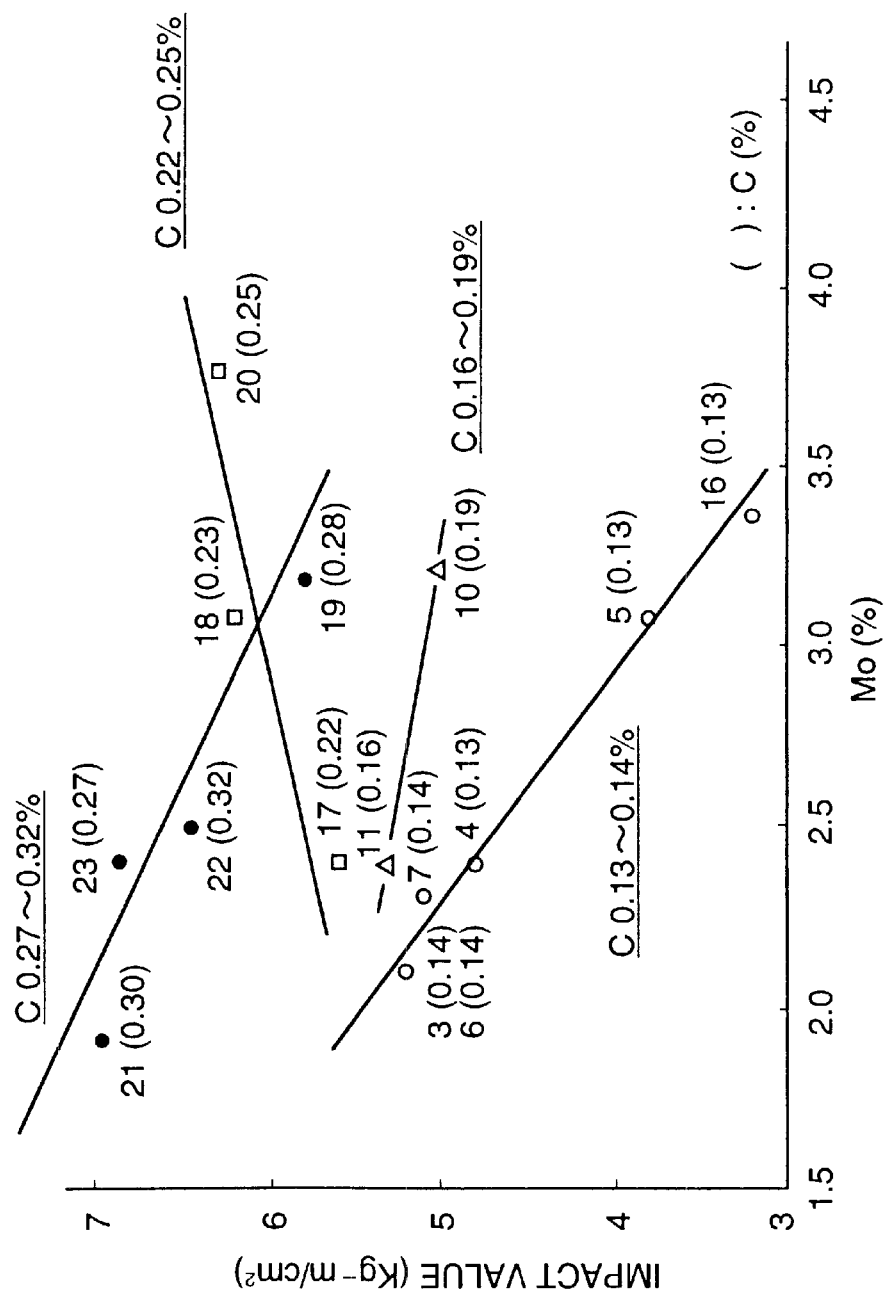
FIG. 6 is a graph showing the relationship between impact value and molybdenum content Mo (%).

FIG. 6 is a graph showing the relationship between impact value and molybdenum content. As shown in the figure, the effect of Mo content on the impact value is different depending on the C content. In all the cases where the C contents are within the ranges of 0.13 to 0.14%, 0.16 to 0.19% and 0.27 to 0.32%, the impact value decreases as the Mo content is increased. However, in the case where the C content is 0.22 to 0.25%, the impact value increases as the Mo content is increased. Particularly, the impact value above 5 kg·m/cm$^2$ can be obtained by setting the Mo content to a value larger than 1.5% in the case where the C content is 0.22 to 0.25%, and further by setting the Mo content to a value less than 4.0% in the case where the C content is above 0.27%. Further, the impact value above 6 kg·m/cm$^2$ can be obtained by setting the Mo content to a value above 3% when the C content is 0.22 to 0.25%, and by setting the Mo content to a value less than 3.1% when the C content is larger than 0.27%.

The martensite steel having the composition falling within the range formed by connecting the points (A), (B), (C) and (D) has an impact value larger than 3.8 kg·m/cm$^2$, and the martensite steel having the composition falling within the range formed by connecting the points (E), (F) and (G) has an impact value larger than 4.8 kg·m/cm².

Figure 7:
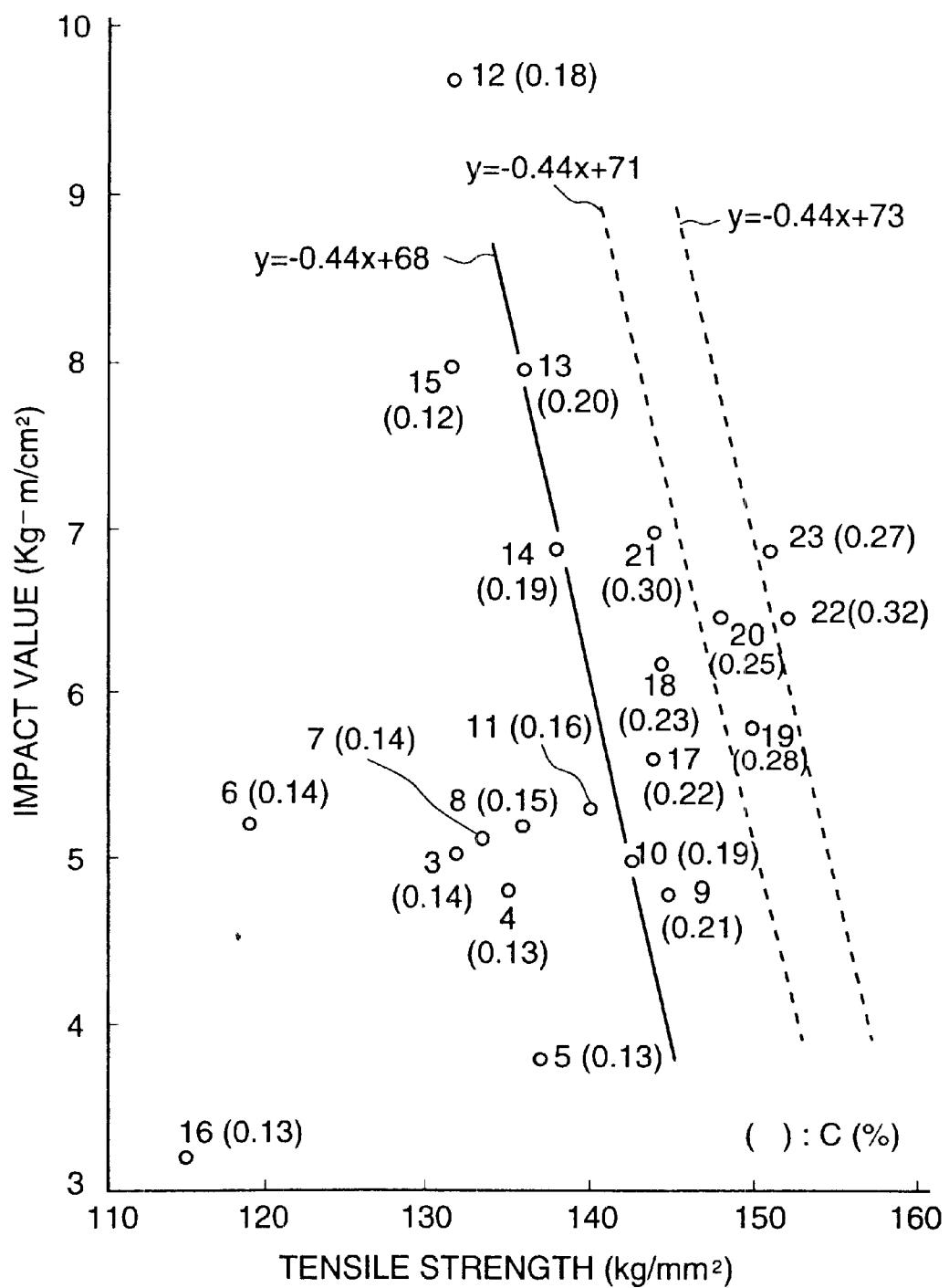
FIG. 7 is a graph showing the relationship between impact value and tensile strength.

FIG. 7 is a graph showing the relationship between impact value and tensile strength. In the case where the C content is above 0.19%, it is preferable that the impact value (kg·m/cm²) (y) is set to a value larger than the value (y=−0.44x+68) calculated from a tensile strength (x). Further, in the case where the C content is above 0.25%, it is preferable that the impact value (kg·m/cm²) is set to a value larger than the value calculated from y=−0.44x+71. Furthermore, in the case where the C content is above 0.30%, it is preferable that the impact value (kg·m/cm²) is set to a value larger than the value calculated from y=−0.44x+73.

By using the martensite steel having the impact value larger than the value calculated by the above-mentioned equation y=−0.44x+68 and by making the tensile strength above 140 kg/mm², the blade can be made so as to have the blade length above 46 inches for the rotating speed of 3000 rpm and the blade length above 37.5 inches for the rotating speed of 3600 rpm because the martensite steel has a tensile strength above 140 kg/mm². Further, by using the martensite steel having the impact value larger than the value calculated by the above-mentioned equation y=−0.44x+71 and by making the tensile strength above 145 kg/mm², the blade can be made so as to have the blade length above 48 inches for the rotating speed of 3000 rpm and the blade length above 40 inches for the rotating speed of 3600 rpm. Furthermore, by using the martensite steel having the impact value larger than the value calculated by the above-mentioned equation y=−0.44x+73 and by making the tensile strength above 150 kg/mm², the low pressure steam turbine mounting the rotor blades have the blade length above 50 inches for the rotating speed of 3000 rpm and the blade length above 41.5 inches for the rotating speed of 3600 rpm can be made.

In addition to the present embodiment, a study is now being progressed on the property of a martensite steel for steam turbine composed of C of 0.35%; Si of 0.03%; Mn of 0.15%; Ni of 2.80%; Cr of 12%; Mo of 2.30%; V of 0.25%; Nb of 0.15%; N of 0.075% and the remainder of Fe, or C of 0.35%; Si of 0.03%; Mn of 0.15%; Ni of 3.50%; Cr of 12%; Mo of 3.3%; V of 0.25%; Nb of 0.15%; N of 0.075% and the remainder of Fe.

[Embodiment 2]

Figure 8:
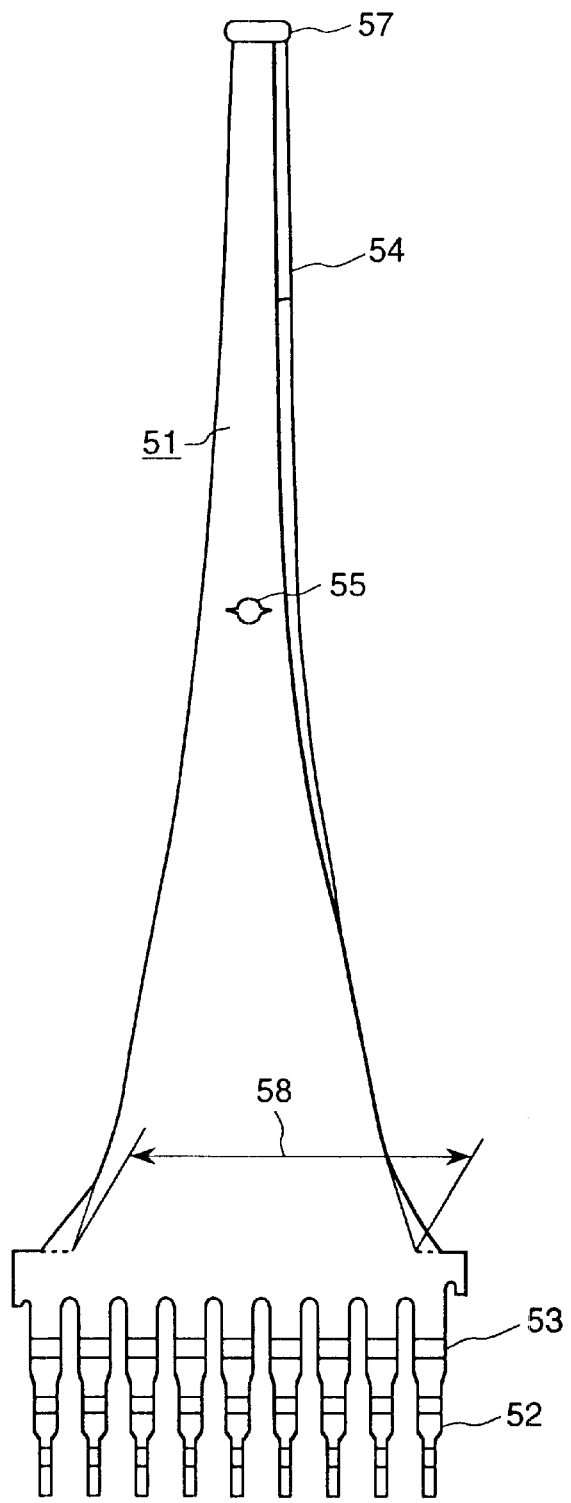
FIG. 8 is a front view showing a steam turbine blade.
Figure 9:
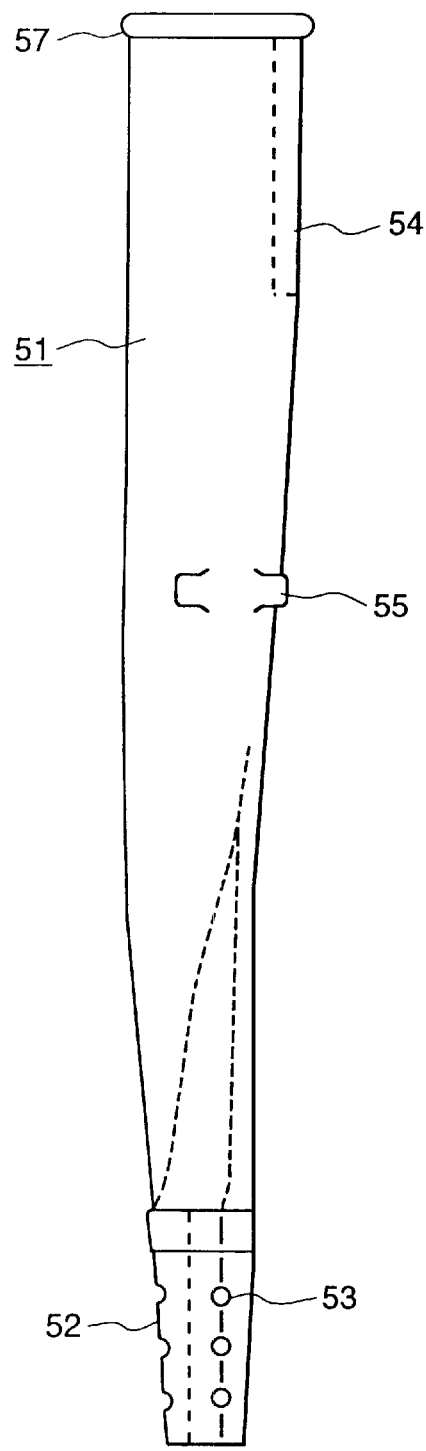
FIG. 9 is a side view showing the steam turbine blade.

FIG. 8 is a front view showing a long blade having a blade length of 1168.4 mm (46 inches) for 3000 rpm rotating speed which is made of the first embodiment of the steel in accordance with the present invention, and FIG. 9 is a side view showing the blade. The reference character 51 is a blade portion on which high speed steam fits; the reference character 52 is a blade implanting portion to a rotor shaft; the reference character 53 is a pin inserting hole into which a pin for holding the blade against a centrifugal force is inserted; the reference character 54 is an erosion shield (a Stellite plate made of a Co base alloy is bonded on the blade through welding) provided in the leading portion of the blade which prevents occurrence of erosion caused by water droplets in the steam; the reference character 55 is a tie both and the reference character 57 is a continuous cover. The blade in the present embodiment was formed by cutting work after forging the whole body. Therein, the continuous cover 57 may be mechanically formed in a unit. The erosion shield may be provided by increasing hardness of the leading portion through local quenching.

The 46" long blade was formed by melting through an electro-slug re-melting method, forging and heat treatment. The forging was performed within a temperature range of 850 to 1150° C., and the heat treatment was performed according to the condition described in Embodiment 1. The metallic structure of the long blade was the fully annealed martensite structure. The thickness of the blade portion 51 is the thickest in the implanting portion and gradually thinned toward the top end portion.

As shown in FIG. 8 and FIG. 9, the blade implanting portion 52 is of a fork shape having nine prongs. The pin inserting holes 53 for inserting pins therein are provided in three stages on the side surfaces of the fork-shaped implanting portion shown in FIG. 9, and depressing portions are provided corresponding to the pin inserting holes. The diameter of the pin inserting hole 53 is the largest in the blade portion side, and gradually smaller toward the shaft side. The inclination of the blade portion 51 in the width direction is nearly parallel to the axial direction of the wheel shaft in the blade implanting portion 52, and is inclined by approximately 75 degrees in the top end portion of the blade. The maximum width of the blade implanting portion 52 in the present embodiment is approximately 2.4 times of the width of the top end portion of the blade, and the ratio is preferably 2.2 to 2.6 times. The reference character 58 indicates a width on an extension of a tangent line to a position near the blade implanting portion 52 of the blade portion 51, and is an effective width of the blade portion 51. The effective width is approximately 1.79 times of the width of the top end portion of the blade, and the ratio is preferably 1.60 to 1.85 times.

Figure 10:
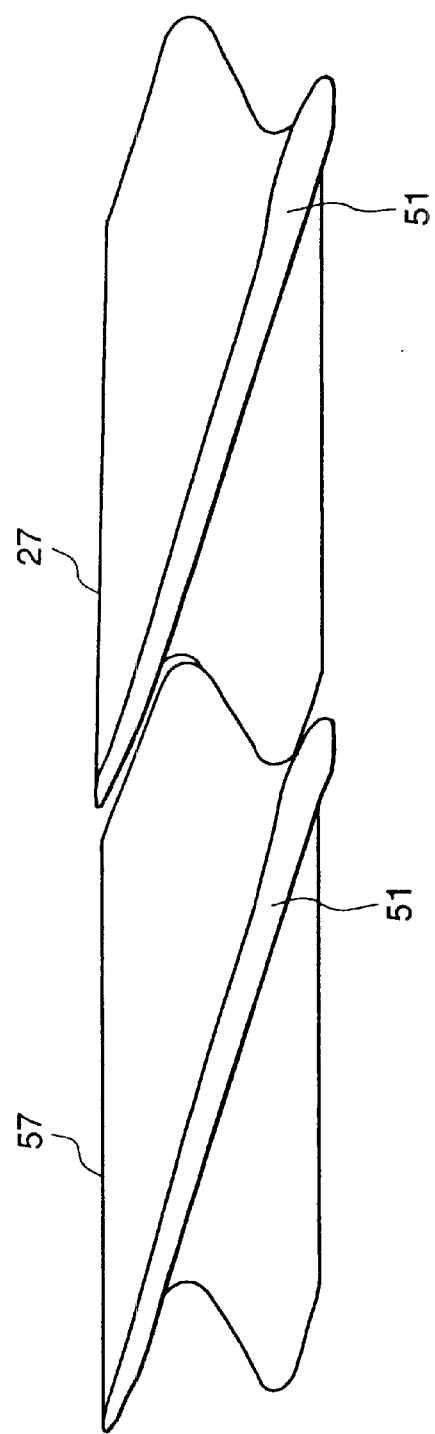
FIG. 10 is a plan view showing an upper end portion of the steam turbine blade.

FIG. 10 is a front view showing the positional relationship between the continuous covers 57 in the turbine blades arranged in a steam turbine seeing from an upper surface side of the peripheral portion of the steam turbine blade. The blade portions 51 are arranged so as to overlap the adjacent blade each other. The blade portions 51 are also arranged so as to block stream of the steam. The continuous cover 57 is integrated together with the main body and made of the same material as that of the main body. The top end of the blade portion 51 is twisted by approximately 75.5 degrees to the axial direction so as to cross to the blade implanting portion 52.

Therein, the martensite steel of the sample No. 12 described in Embodiment 1 can have a target tensile strength above 138.5 kg/mm² and a target impact value above 4 kg·m/cm² by slightly increasing the quenching temperature.

Figure 11:
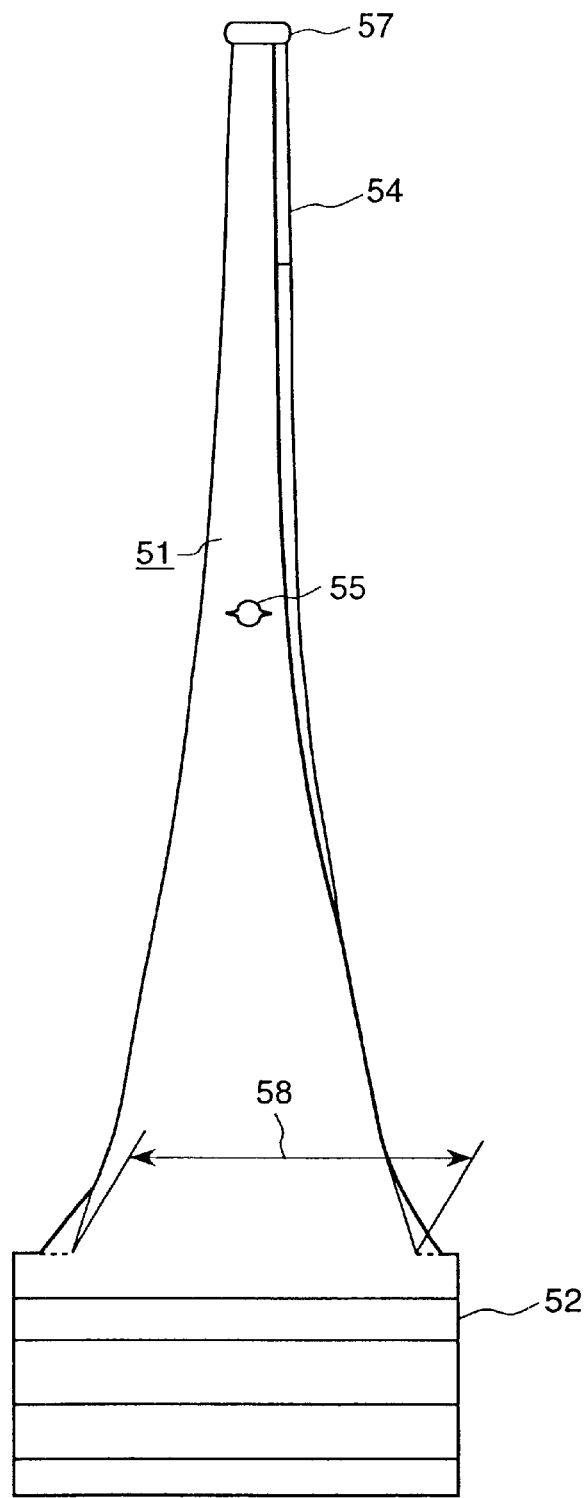
FIG. 11 is a front view showing a steam turbine blade.
Figure 12:
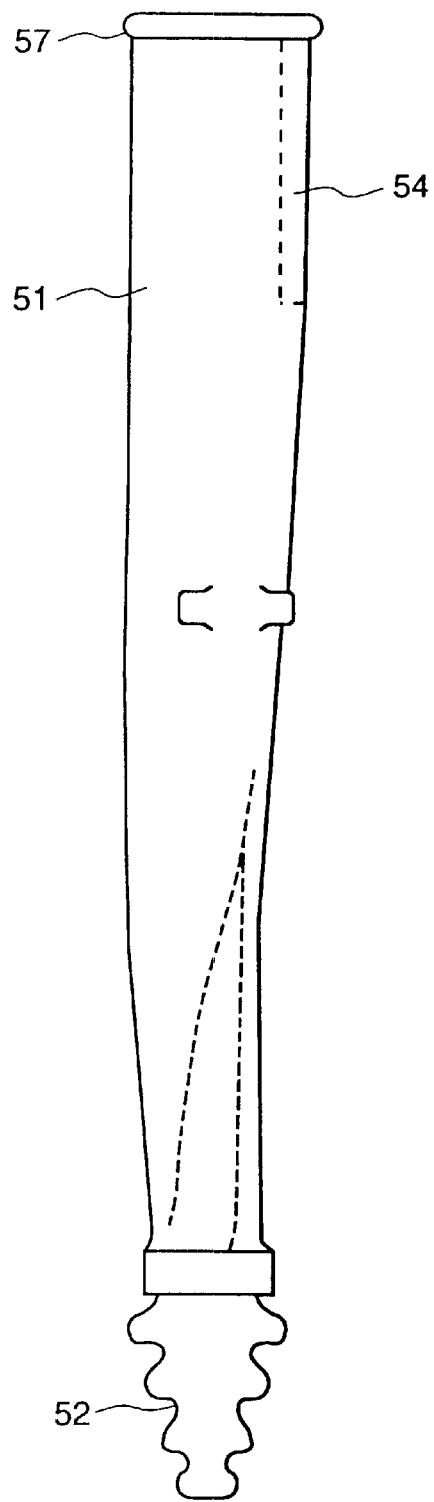
FIG. 12 is a side view showing the steam turbine blade.

FIG. 11 is a front view showing a steam turbine blade having a blade length of 46 inches of which the implanting portion is of an inverse Christmas tree type, and FIG. 12 is a side view of the steam turbine blade. A different point of the steam turbine blade shown in the figures from that shown in FIG. 8 and FIG. 9 is only the shape of the implanting portion 52, and the other structures are the same. As shown in these figures, the blade implanting portion 52 has four straight projections in each side, and the blade rotated at a high speed is implanted and fixed to the rotor shaft by the projections. A groove having the same shape is formed in the rotor shaft along the axial direction of the rotor shaft so that the blade implanting portions are implanted therein.

In addition to these embodiments, a blade having a shape similar to that of the present embodiment can cope with each of the blades having blade length of 48", 50" and 52" for rotating speed of 3000 rpm and the blades having blade length of 37.5", 40" and 43" for rotating speed of 3600 rpm.

[Embodiment 3]

Table 3 shows the main specification of a steam turbine of 1050 MW and 625° C. steam temperature in accordance with the present invention. In the present embodiment, the turbine type is of a cross-compound type four-flow exhaust, the blade length of the rotor blade in the final stage in the low pressure turbine is 46 inches, the turbine configuration A is composed of HP-IP and two LP of 3000 rotations/min, the turbine configuration B is composed of HP-IP and IP-LP of 3000 rotations/min, the high temperature portions of the turbines are mainly made of the materials shown in the table. The high pressure part (HP) is operated at a steam temperature of 625° C. and a pressure of 250 kgf/cm$^2$, and the intermediate pressure part (IP) is operated a re-heated steam temperature of 625° C. and a pressure of 45 to 65 kgf/cm$^2$. The steam at a temperature of 400° C. enters into the low pressure part (LP), and the steam at a temperature below 100° C. and a vacuum pressure of 722 mm Hg is guided to the condenser.

In the present embodiment, the total length of the distance between bearings of the high pressure turbine and the intermediate pressure turbine coupled in tandem and the distance between bearings of the two low pressure turbines coupled in tandem is approximately 31.5 m, and the ratio of the total length to the blade length of the rotor blade in the final stage of the low pressure turbine is 28.8. Accordingly, the turbine is made compact.

In addition, in the present embodiment, the ratio of the total length (mm) of the distance between bearings of the high pressure turbine and the intermediate pressure turbine coupled in tandem and the distance between bearings of the two low pressure turbines coupled in tandem to the rated output power (MW) of the steam turbine plant is 30.

Figure 13:
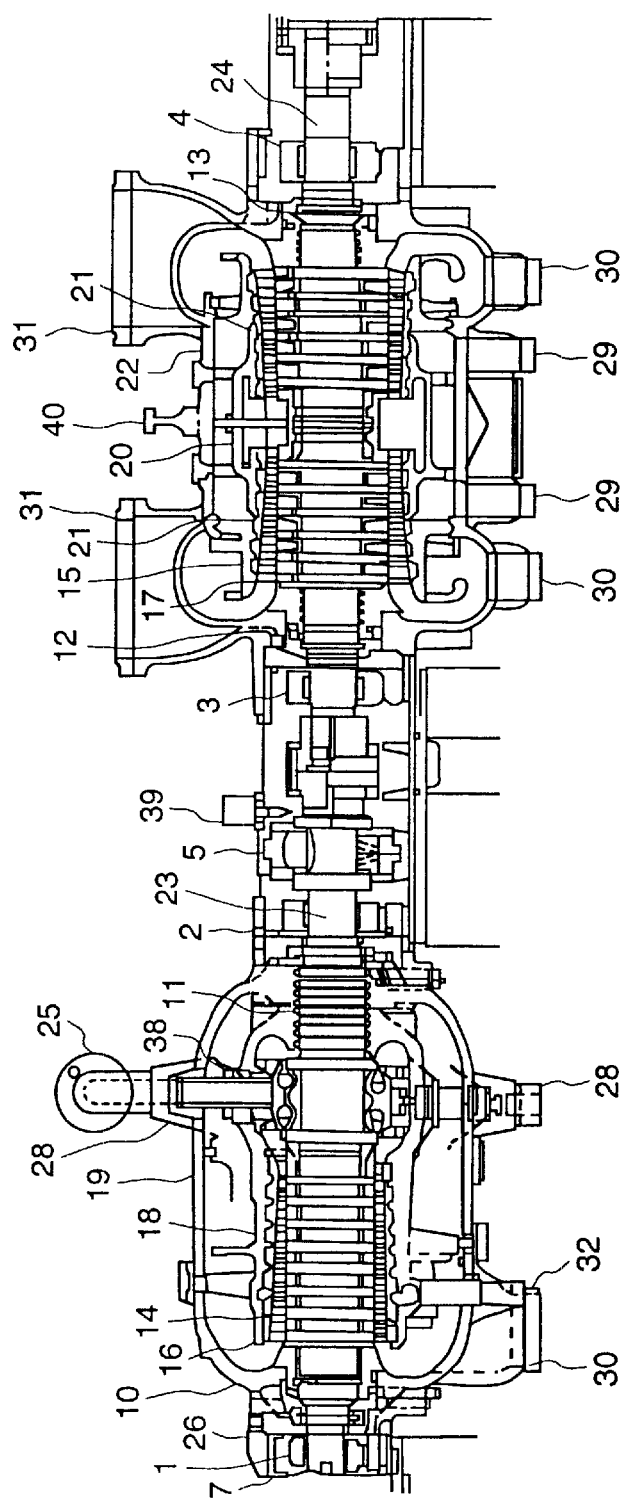
FIG. 13 is a cross-sectional view showing a high pressure turbine and a intermediate pressure turbine which are coupled with each other.

FIG. 13 is a cross-sectional view showing the high pressure and the intermediate pressure steam turbines in the turbine configuration A of Table 3. The high pressure steam turbine comprises a high pressure inner wheel chamber 18 and a high pressure wheel shaft (high pressure rotor shaft) 23 mounting the high pressure rotor blades 16 in a high pressure outer chamber 19 outside the high pressure inner wheel chamber. The high temperature and high pressure steam described above is obtained by the above-mentioned boiler, and flows through a main steam pipe, and flows through a main steam inlet port 28 from a flange and an elbow 25 composing the main steam inlet port, and conducted to the rotor blades in the double flow first stage from a nozzle box 38. The first stage is of double flow, and eight stages are provided in one side. Fixed blades are arranged corresponding to these rotor blades. The rotor blades are of tangential entry dovetail type and double tenon, and the blade length in the first stage is approximately 35 mm. The length between the bearings is approximately 5.8 m, and the diameter of the smallest portion corresponding to the fixed blade portion is approximately 710 mm, and the ratio of the length between the bearings to the diameter is approximately 8.2.

In the present embodiment, a material shown in Table 6 to be described later is used for the first stage blades and the first stage nozzle, and both of the other blades and the other nozzles are made of a 12% Cr group steel not containing W, Co and B. The blade lengths of the rotor blades in this embodiment are 35 to 50 mm in the first stage and become

TABLE 3

| | |
|---|---|
| Type of turbine | CC4F-46 |
| Number of rotation | 3000/3000 rpm |
| Steam condition | 24.1 MPa - 625° C./625° C. |

Turbine configuration A

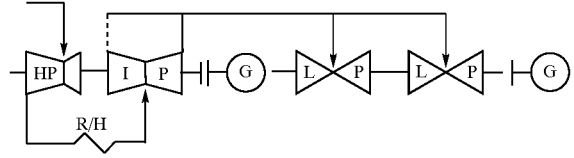

B

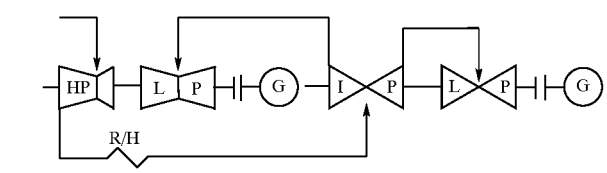

| | |
|---|---|
| Blade structure in first stage | Double flow, Double tenon tangential entry dovetail |
| Blade in final stage | High strength 12Cr forged steel |
| Main steam stop valve body Steam control valve body | High strength 12Cr forged steel |
| H. P. rotor | High strength 12Cr forged steel |
| I. P. rotor | High strength 12Cr forged steel |
| L. P. rotor | 3.5 Ni—Cr—Mo—V forged steel |
| Rotor blade in H. T. part | First stage: High strength 12Cr forged steel |
| H. P. wheel chamber: | |
| Inner part | High strength 9Cr cast steel |
| Outer part | High strength Cr—Mo—V—B cast steel |
| I. P. wheel chamber: | |
| Inner part | High strength 9Cr cast steel |
| Outer part | High strength Cr—Mo—V—B cast steel |
| Thermal efficiency (rated, gross) | 47.5% |

(CC4F-46: cross-compound type four-flow exhaust, 46 inches long blade, HP: high pressure part, IP: intermediate pressure part, LP: low pressure part, R/H: reheater (boiler))

longer stage by stage from the second stage to the final stage, and particularly the blade lengths from the second stage to the final stage are 65 to 180 mm depending on the output power of the steam turbine. Number of the stages is 9 to 12. A ratio of the length of the blade portion in the downstream side to the length of the adjacent blade in the upstream side is increased by 1.10 to 1.15, and the ratio is gradually increased toward the downstream side.

In the high pressure turbine of the present embodiment, the distance between the bearings is approximately 5.3 m, and the ratio of the distance between the bearings to the blade length of the rotor blade of the low pressure turbine in the final stage is 4.8. The ratio of the distance (mm) between bearings of the high pressure turbine to the rated output power (MW) of the steam turbine plant is 5.0.

The intermediate pressure steam turbine is driven by the steam exhausted from the high pressure steam turbine which is re-heated up to 625° C. by the reheater to rotate the generator together with the high pressure steam turbine at a rotating speed of 3000 rpm. Similar to the high pressure steam turbine, the intermediate pressure steam turbine comprises an intermediate pressure inner second wheel chamber 21 and an intermediate pressure outer chamber 22, and fixed blades are arranged opposite to intermediate pressure rotor blades 17. The blades 17 are in 6 stages and double flow, and symmetrically arranged in the longitudinal direction of an intermediate pressure wheel shaft (intermediate pressure rotor shaft). The distance between the bearing centers is approximately 5.8 m, and the blade length in the first stage is approximately 100 mm, and the blade length in the final stage is approximately 230 mm. The dovetails in the first stage and the second stage are of an inverse-christmas-tree type. The diameter of the rotor shaft at a position corresponding to the fixed blades before the rotor blades in the final stage is approximately 630 mm, and the ratio of the distance between the bearings to the diameter is approximately 9.2.

In the rotor shaft of the intermediate pressure steam turbine in this embodiment, the width in the axial direction of the rotor blade implanting portion is increased step-by-step in three steps of the first stage to the fourth stage, the fifth stage, and the final stage. The width in the final stage is approximately 1.4 times of that in the first stage.

Further, in the rotor shaft of the steam turbine, the diameter at a portion corresponding to the fixed blades is made smaller, and the width is decreased step-by-step in four steps the first stage, the second to the third stage and toward the final stage, and the width in the axial direction in the latter is decreased by approximately 0.75 times as small as that of the former.

In the present embodiment, a material shown in Table 6 to be described later is used for the first stage blades and the first stage nozzle, and both of the other blades and the other nozzles are made of a 12% Cr group steel not containing W, Co and B. The blade lengths of the rotor blades in this embodiment are increased from the first stage toward the final stage, and the lengths from the first stage to the final stage are varied from 60 to 300 mm depending on the output power of the steam turbine. Number of the stages is 6 to 9. A ratio of the length of the blade portion in the downstream side to the length of the adjacent blade in the upstream side is increased by 1.1 to 1.2.

The diameter of the implanting portion of the rotor blade is larger than the diameter of the corresponding fixed blade, and the width of the implanting portion of the rotor blade is wider as the blade length of the rotor blade is longer. The ratio of the width to the blade length of the rotor blade is 0.35 to 0.8 in the first stage to the final stage, and is decreased step-by-step from the first stage toward the final stage.

In the intermediate pressure turbine of the present embodiment, the distance between the bearings is approximately 5.5 m, and the ratio of the distance between the bearings of the intermediate pressure turbine to the blade length of the rotor blade of the low pressure turbine in the final stage is 5.0. The ratio of the distance (mm) between bearings to the rated output power (MW) of the steam turbine plant is 5.2.

The turbine blade implanted in the first stage of the high pressure turbine has a saddle-shaped implanting portion, and the turbine blades implanted in the second stage and on of the high pressure turbine and all the blades in the intermediate pressure turbine have an inverse Christmas tree type implanting portion.

Figure 14:
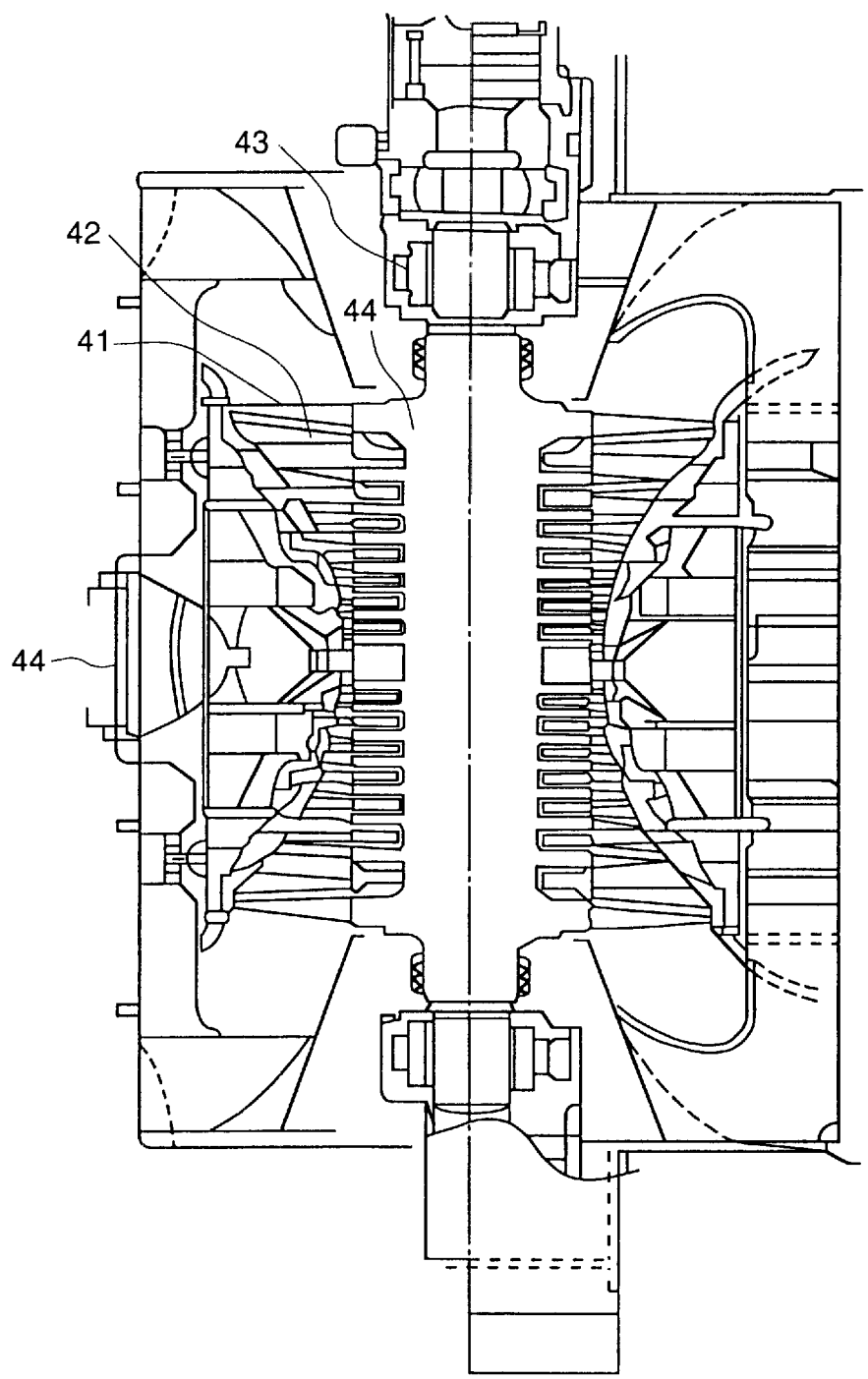
FIG. 14 is a cross-sectional view showing a low pressure turbine.

FIG. 14 is a cross-sectional view showing the low pressure turbine. Two of the low pressure turbines are coupled in tandem, and each of the low pressure turbines is nearly similar in structure. The rotor blades 41 are nearly symmetrically arranged in both sides each eight stages, and fixed blades 42 are arranged corresponding to the rotor blades. The steam turbine blades having a blade length of 46 inches described in Embodiment 2 are used for the rotor blades in the final stage. The nozzle box 45 is of a double flow type.

A forged steel of super-cleaned fully annealed bainite steel shown in Table 4 is used for the rotor shaft 44. Various kinds of properties of the steels shown in Table 4 were studied using steel blocks of 5 kg. These steels obtained by heating at 840° C. for 3 hours after hot forging, quenching it through cooling at 100° C./h, and then annealing it at 575° C. for 32 hours. Table 5 shows the properties at room temperature.

TABLE 4

| No. | C | Si | Mn | P | S | Ni | Cr | Mo | V | Sn | Al | As | Sb | Other |
|---|---|---|---|---|---|---|---|---|---|---|---|---|---|---|
| 1 | 0.25 | 0.04 | 0.16 | 0.013 | 0.004 | 3.77 | 2.08 | 0.34 | 0.13 | 0.005 | 0.009 | 0.004 | <0.0005 | |
| 2 | 0.27 | 0.04 | 0.15 | 0.012 | 0.004 | 3.35 | 1.97 | 0.34 | 0.12 | 0.004 | 0.002 | 0.003 | ibid. | |
| 3 | 0.26 | 0.04 | 0.15 | 0.011 | 0.011 | 4.15 | 1.95 | 0.45 | 0.14 | 0.005 | 0.005 | 0.004 | ibid. | |
| 4 | 0.26 | 0.05 | 0.15 | 0.011 | 0.011 | 3.78 | 2.35 | 0.43 | 0.13 | 0.005 | 0.007 | 0.004 | ibid. | |
| 5 | 0.23 | 0.04 | 0.15 | 0.010 | 0.010 | 3.75 | 1.98 | 0.42 | 0.13 | 0.004 | 0.008 | 0.003 | ibid. | Nb 0.02 |
| 6 | 0.25 | 0.05 | 0.10 | 0.010 | 0.010 | 3.75 | 1.75 | 0.40 | 0.15 | 0.005 | 0.007 | 0.004 | ibid. | |

TABLE 5

| No. | 0.02% Yield Stren (kg/mm²) | 0.2% Yield Stren (kg/mm²) | Tensile Stren. (kg/mm²) | Elongation (%) | Contraction (%) | Impact Value (kg-m) | FATT (° C.) |
| --- | --- | --- | --- | --- | --- | --- | --- |
| 1 | 82.6 | 93.6 | 106.6 | 19.8 | 66.1 | 13.8 | −27 |
| 2 | 82.5 | 94.2 | 107.2 | 20.1 | 64.2 | 15.5 | −23 |
| 3 | 83.4 | 93.9 | 106.8 | 19.2 | 63.9 | 12.3 | −59 |
| 4 | 79.9 | 89.3 | 102.8 | 19.7 | 61.9 | 11.2 | −39 |
| 5 | 84.2 | 95.4 | 107.9 | 18.9 | 64.2 | 10.6 | −55 |
| 6 | 83.9 | 94.8 | 107.6 | 19.5 | 64.0 | 14.5 | −20 |

Each of the samples had the fully annealed bainite structure, and has high strength and high toughness that the 0.02% yield strength was above 80 kg/mm², the 0.2% yield strength was above 87.5 kg/mm², the tensile strength was above 100 kg/mm², the V-notch impact value was above 10 kg-m and the FATT was below −20° C., and accordingly satisfied the requirement of the rotor blade in the final stage in this embodiment having a blade length not only above 43 inches but also 46 inches. The sample No. 4 having a slightly high Cr content is low in the strength, and accordingly it is preferable that the Cr content is 2.20% at the maximum. Particularly, it is preferable that the 0.2% yield strength (y) is lager than a value calculated by (1.35x−20) using the 0.02% yield strength (x), further preferably, lager than a value calculated by (1.35x−19). In addition, it is preferable that the tensile strength (y) is a value within the range calculated by y=0.89x+22.2 to 24.2 using the 0.2% yield strength (x).

A 12% Cr steel containing Mo of 0.1% is used for both of the rotor blades other than in the final stage and the fixed blades. A cast steel containing C of 0.25% is used for the inner and the outer casing material. In the present embodiment, the distance between the centers of the bearings 43 is 7500 mm, and the diameter of the rotor shaft corresponding to the fixed blade portion is approximately 1280 mm, and the diameter at the rotor blade implanting portion is 2275 mm. The ratio of the distance between the centers of the bearings to the diameter of the rotor shaft is approximately 5.9.

The erosion shield 54 for preventing erosion by water droplets in the steam is formed by bonding a stellite plate made of a Co base alloy containing C of 1.0%, Cr of 28.0% and W of 4.0% on weight basis to the blade through electron beam welding. In the present embodiment, the continuous cover 57 is formed through cutting work after forging the whole body in a unit. Therein, the continuous cover 57 may be mechanically formed in a unit.

In the present embodiment, the width in the axial direction of the blade implanting portion in the low pressure turbine is gradually increased in four steps of the first stage to third stage, the fourth stage, the fifth stage, the sixth stage to the seventh stage and the eighth stage, and the width in the final stage is approximately 2.5 times as wide as the width in the first stage.

Further, the diameter at a portion corresponding to the fixed blades is made smaller, and the width in the axial direction at that portion is gradually increased in three steps of the fifth stage, the sixth stage and the seventh stage from the rotor blade side in the first stage, and the width in the final stage side is approximately 1.9 times as large as the width between the first stage and the second stage.

The rotor blades in this embodiment are arranged in eight stages, and the blade lengths of the rotor blades are increased in each stage from approximately 3 inches in the first stage to 43 inches in the final stage, that is, the blade lengths are 90 to 1270 mm from the first stage to the final stage depending on the output power of the steam turbine. Number of the stages is 8 to 9. A ratio of the length of the blade in the downstream side to the length of the adjacent blade in the upstream side in each stage is increased by 1.3 to 1.6.

The diameter of the implanting portion of the rotor blade is larger than the diameter of the corresponding fixed blade, and the width of the implanting portion of the rotor blade is wider as the blade length of the rotor blade is longer. The ratio of the width to the blade length of the rotor blade is 0.15 to 0.19 in the first stage to the final stage, and is decreased step-by-step from the first stage toward the final stage.

The width of the rotor shaft at a portion corresponding to each of the fixed blades is increased step-by-step in each stage from the portion between the first stage and the second stage to the portion between the final stage and the precedent stage. the ratio of the width to the blade length of the rotor blade is 0.25 to 1.25, and is decreased from the upstream side toward the downstream side.

Two of the low pressure turbines in this embodiment are coupled in tandem, and the total distance between the bearings is approximately 18.3 m, and the ratio of the total distance between the bearings of the two low pressure turbines coupled in tandem to the blade length of the rotor blade in the final stage of the low pressure turbine is 16.7, and further the ratio of the total distance (mm) between the bearings in the both ends of the two low pressure turbines coupled in tandem to the rated output power of 1050 (MW) of the power plant is 17.4.

In addition to the present embodiment, the similar configuration can be applied to a 1000 MW class large capacity power plant in which the steam inlet temperature to the high pressure steam turbine and the intermediate pressure steam turbine is 610° C., and the steam inlet temperature to the two low pressure steam turbines is 385° C.

The high temperature and high pressure steam turbine plant in the present embodiment is mainly composed of a coal-only combustion boiler, the high pressure turbine, the intermediate pressure turbine, the two low pressure turbines, a condenser, a condensate pump, a low pressure feed water heater system, a deaerator, a pressurizing pump, a feed pump, a high pressure feed water heater system and so on. That is, the ultra high temperature high pressure steam generated in the boiler enters into the high pressure turbine to generate power, and after being re-heated by the boiler, enters into the intermediate pressure turbine to generate power. The steam exhausted from the intermediate pressure turbine enters into the low pressure turbines to generate power, and then is condensed by the condenser. The condensed liquid is transferred to the low pressure feed water heater system and the deaerator. The feed water deaerated by the deaerator is transferred to the high pressure feed water heater by the pressurizing pump and the feed water pump to be heated, and then returned to the boiler.

There, in the boiler, the feed water is changed to the high temperature high pressure steam by passing through an economizer, an evaporator, a super-heater. On the other hand, the boiler combustion gas after heating the steam flows out of the economizer, and then enters into an air heater to heat air. Therein, a feed pump driving turbine driven by a bled steam from the intermediate pressure turbine is used to drive the feed water pump.

In the high temperature high pressure turbine plant constructed as described above, since the temperature of the feed water flowing out from the high pressure feed water heater system is higher than the feed water temperature in a conventional thermal power plant, the temperature of the combustion gas flowing out from the economizer in the boiler is inevitably higher than the temperature of the combustion gas in the conventional thermal power plant. Therefore, decreasing of the gas temperature is prevented by recovering the heat from the boiler exhaust gas.

Instead of the present embodiment, it is possible to similarly construct a tandem compound type power plant in which one low pressure turbine is individually coupled with each of the similar high pressure turbine and the similar intermediate pressure turbine in tandem, and one generator is further individually coupled with each of the low pressure turbines. The generator of 1050 MW output class of the present embodiment requires a high strength generator shaft. It is preferable that the material has the fully annealed bainite structure, and contains C of 0.15 to 0.30%, Si of 0.1 to 0.3%, Mn less than 0.5%, Ni of 3.25 to 4.5%, Cr of 2.05 to 3.0%, Mo of 0.25 to 0.6% and V of 0.05 to 0.20%, and has a tensile strength at room temperature above 93 kgf/mm$^2$, particularly above 100 kgf/mm$^2$; a 50% FATT below 0° C., particularly preferable below −20° C.; and a magnetizing force at 21.2 KG below 985 AT/cm, and contains P, S, Sn, Sb, As as impurities less than 0.025% in total, and has a ratio of Ni/Cr less than 2.0.

The high pressure turbine shaft has a structure that 9 stages of the blades are implanted so that the first stage blade implanting portion in the multi-stage side comes to the middle of the shaft. The intermediate pressure turbine shaft has a structure that blade implanting portions for multi-stage blades each in 6 stages are symmetrically arranged with respect to a position near the middle of the shaft. A center hole is provided in each of the rotor shafts of the high pressure, the intermediate pressure and the low pressure turbines though it is not shown in the low pressure rotor shaft. Ultrasonic inspection, visual inspection and fluorescence defect inspection are performed through the center hole to inspect presence or absence of defects. The center hole may be omitted because ultrasonic inspection can be performed from the outer surfaces.

Table 6 shows chemical compositions (weight %) of the materials used for the main portion of the high pressure turbine, the intermediate pressure turbine and the low pressure turbine in the present embodiment. In this embodiment, there occurred no problem caused by difference in thermal expansion coefficient because all the high temperature portions of the high pressure part and the intermediate pressure part were made of materials having a ferrite group crystal structure and a thermal expansion coefficient of nearly 12×10$^{-6}$/°C.

Each of the rotor shafts of the high pressure turbine and the intermediate pressure turbine was manufactured by melting 30 tons of the heat resistant cast steel described in Table 6 using an electric furnace, performing carbon vacuum deoxidization, casting in a metal mold, forging the molded material to form an electrode rod, performing electro-slug re-melting so as to melt cast steel from the upper portion to the lower portion using the electrode rod, and forging the obtained material to form in a rotor shape (1050 mm diameter, 3700 mm length). The forging was performed under a temperature below 1150° C. in order to prevent occurrence of forging crack. Further, the forged steel after annealing treatment was performed with quenching treatment by being heated up to 1050° C. and cooled with water spray, and annealed twice at 570° C. and 690° C., and then cut into the final shape. In the present embodiment, the electro-slug steel block was set so that the upper side came in the first stage blade side and the lower side came in the final stage side. Each of the rotor shafts had the center hole, but the center hole may be omitted by reducing the content of impurities.

Each of the blades and the nozzles of the high pressure part and the intermediate pressure part was manufactured by melting the heat resistant steel described in Table 6 using a vacuum arc melting furnace, and forging the obtained material to form in a blade shape or a nozzle shape (150 mm width, 50 mm height, 1000 mm length). The forging was performed under a temperature below 1150° C. in order to prevent occurrence of forging crack. Further, the forged steel was performed with quenching treatment by being heated up to 1050° C. and cooled with oil, and annealed at 690° C., and then cut into the final shape.

Each of the inner casings of the high pressure part and the intermediate pressure part, the main steam stop valve casing and the steam control valve casing was manufactured by melting the heat resistant cast steel described in Table 6 using an electric furnace, casting in a sand mold after ladle refining. By performing refining and deoxidizing sufficiently in prior to casting, the casings without casting defects such as shrinkage could be manufactured. Evaluation of weldability using the casing material was performed according to JIS Z3158. The temperature for preheating, the temperature for pass-to-pass and the temperature at starting of post-heating were set to 200° C., and the post-heating treatment was performed under a condition of 400° C. for 30 minutes. No welding cracks were observed in the materials in accordance with the present invention, and the weldability was excellent.

TABLE 6

| Name of Main Part | C | Si | Mn | Ni | Cr | Mo | W | V | Nb | N | Co | B | Others | Cr Equi | Remark |
|---|---|---|---|---|---|---|---|---|---|---|---|---|---|---|---|
| HP Rotor shaft & IP | 0.11 | 0.03 | 0.52 | 0.49 | 10.98 | 0.19 | 2.60 | 0.21 | 0.07 | 0.019 | 2.70 | 0.015 | — | 5.11 (≦9.5) | Forge steel |
| Blade (1$^{st}$) | 0.10 | 0.04 | 0.47 | 0.51 | 11.01 | 0.15 | 2.62 | 0.19 | 0.08 | 0.020 | 2.81 | 0.016 | — | 5.07 (≦10) | ibid. |
| Nozzle (1$^{st}$) | 0.09 | 0.04 | 0.55 | 0.59 | 10.50 | 0.14 | 2.54 | 0.18 | 0.06 | 0.015 | 2.67 | 0.013 | — | 4.54 (ibid.) | ibid. |
| Inner casing | 0.12 | 0.19 | 0.50 | 0.68 | 8.95 | 0.60 | 1.68 | 0.18 | 0.06 | 0.040 | — | 0.002 | — | 7.57 | Cast steel |
| Outer casing | 0.12 | 0.21 | 0.32 | 0.08 | 1.51 | 1.22 | — | 0.22 | — | — | — | 0.0007 | Ti 0.05 | — | ibid. |

TABLE 6-continued

| Name of Main Part | C | Si | Mn | Ni | Cr | Mo | W | V | Nb | N | Co | B | Others | Cr Equi | Remark |
|---|---|---|---|---|---|---|---|---|---|---|---|---|---|---|---|
| In casing fast. bolt | 0.11 | 0.10 | 0.50 | 0.60 | 10.82 | 0.23 | 2.80 | 0.23 | 0.08 | — | 3.00 | 0.020 | Al 0.01 | 4.72 | Forge steel |
| LP Rotor shaft | 0.25 | 0.03 | 0.04 | 3.68 | 1.75 | 0.36 | — | 0.13 | — | 0.021 | — | — | — | — | ibid. |
| Blades (ex. Final St) | 0.11 | 0.20 | 0.53 | 0.43 | 12.07 | 0.07 | — | — | — | — | — | — | — | — | ibid. |
| Nozzle | 0.12 | 0.18 | 0.50 | 0.43 | 12.13 | 0.10 | — | — | — | — | — | — | — | — | ibid. |
| Inner casing | 0.25 | 0.51 | — | — | — | — | — | — | — | — | — | — | — | — | Cast steel |
| Outer casing | 0.24 | 0.50 | — | — | — | — | — | — | — | — | — | — | — | — | ibid. |
| M. steam stop valve casing | 0.10 | 0.19 | 0.48 | 0.65 | 8.96 | 0.60 | 1.62 | 0.20 | 0.05 | 0.042 | — | 0.002 | — | 8.56 | ibid. |
| Steam control valve casing | 0.12 | 0.21 | 0.52 | 0.63 | 9.00 | 0.63 | 1.70 | 0.17 | 0.06 | 0.039 | — | 0.001 | — | 7.97 | ibid. |

Table 7 shows mechanical properties obtained from cutting investigation of the steam turbine main components of ferrite group steels described above and the heat treatment conditions.

As the result of the investigation of the central portion of the rotor shafts, it was verified that the materials sufficiently satisfied the properties required for the high pressure, the intermediate pressure and the high and intermediate pressure turbine rotors (625° C., $10^5$ h strength $\geqq 10$ kgf/mm$^2$, 20° C. impact absorption energy $\geqq 1.5$ kgf-m). It was shown that the steam turbine rotors capable of being used in the steam above 620° C. could be manufactured.

Further, as the result of the investigation of the properties of the blades, it was verified that the materials sufficiently satisfied the properties required for the first stage blades of the high pressure, the intermediate pressure and the high and intermediate pressure turbines (625° C., $10^5$ h strength $\geqq 15$ kgf/mm$^2$). It was shown that the steam turbine blades capable of being used in the steam above 620° C. could be manufactured.

Furthermore, as the result of the investigation of the properties of the casings, it was verified that the materials sufficiently satisfied the properties required for the high pressure, the intermediate pressure and the high and intermediate pressure turbine casings (625° C., $10^5$h strength $\geqq 10$ kgf/mm$^2$, 20° C. impact absorption energy $\geqq 1$ kgf-m). It was shown that the steam turbine casings capable of being used in the steam above 620° C. could be manufactured.

TABLE 7

| Name of Main Part | | Tensile strength (kgf/mm$^2$) | 0.2% yield strength (kgf/mm$^2$) | Elongation (%) | Contraction (%) | Impact value (kgf-m) | FATT (%) | $10^5$ h creep rupture strength (kgf/mm$^2$) | | | Heat treatment condition |
|---|---|---|---|---|---|---|---|---|---|---|---|
| | | | | | | | | 625° C. | 575° C. | 450° C. | |
| HP & IP | Rotor shaft | 90.5 | 76.5 | 20.6 | 66.8 | 3.8 | 40 | 17.0 | — | — | 1050° C. × 15 h Water Spray Cool, 570° C. × 20 h Furnace Co 690° C. × 20 h Furnace Cool. |
| | Blade (1$^{st}$) | 93.4 | 81.5 | 20.9 | 69.8 | 4.1 | — | 18.1 | — | — | 1075° C. × 1.5 h Oil Cool, 740° C. × 5 h Air Cool. |
| | Nozzle (1$^{st}$) | 93.0 | 80.9 | 21.4 | 70.3 | 4.8 | — | 17.8 | — | — | 1050° C. × 1.5 h Oil Cool, 690° C. × 5 h Air Cool. |
| | Inner casing | 79.7 | 60.9 | 19.8 | 65.3 | 5.3 | — | 11.2 | — | — | 1050° C. × 8 h Air Blow Cool, 600° C. × 20 h Furnace Cool, 570° C. × 20 h Furnace Cool. |
| | Outer casing | 69.0 | 53.8 | 21.4 | 65.4 | 1.5 | — | — | 12.5 | — | 1050° C. × 8 h Air Blow Cool, 725° C. × 10 h Furnace Cool. |
| | In casing fast. bolt | 107.1 | 91.0 | 19.5 | 88.7 | 2.0 | — | 18.0 | — | — | 1075° C. × 2 h Oil Cool, 740° C. × 5 h Air Cool. |
| LP | Rotor shaft | 91.8 | 80.0 | 22.0 | 70.1 | 19.1 | −50 | — | — | 36 | 950° C. × 15 h Water Spray Cool, 605° C. × 45 h Furnace Cool. |
| | Blades (ex. Final St) | 80.0 | 66.0 | 22.1 | 67.5 | 3.5 | — | — | — | 27 | 950° C. × 1.5 h Oil Cool, 650° C. × 5 h Air Cool. |
| | Nozzle | 79.8 | 65.7 | 22.4 | 69.6 | 3.8 | — | — | — | 26 | 950° C. × 1.5 h Oil Cool, 650° C. × 5 h Air Cool. |
| | Inner casing | 41.5 | 22.2 | 22.2 | 81.0 | — | — | — | — | — | — |
| | Outer casing | 41.1 | 20.3 | 24.5 | 80.5 | — | — | — | — | — | — |
| M. steam stop valve casing | | 77.0 | 61.0 | 18.6 | 65.0 | 2.5 | — | 11.2 | — | — | 1050° C. × 8 h Air Blow Cool, 600° C. × 20 h Furnace Cool, 730° C. × 20 h Furnace Cool. |
| Steam control valve casing | | 77.5 | 61.6 | 18.2 | 64.8 | 2.4 | — | 11.0 | — | — | 1050° C. × 8 h Air Blow Cool, 600° C. × 20 h Furnace Cool, 730° C. × 20 h Furnace Cool. |

In the present embodiment, a Cr—Mo low alloy steel was overlay welded onto the journal portions of the high pressure and the intermediate pressure rotor shafts to improve the bearing property. The overlay welding was performed as follows.

Sheathed arc welding rods (4.0 mm diameter) were used as the test welding rods. Table 8 shows the chemical compositions (weight %) of welded metals welded using the welding rods. The composition of the welded metals were nearly equal to the compositions of the welding materials. The welding condition is that welding current was 170 A, welding voltage was 24 V, and welding speed was 26 cm/min.

TABLE 8

| No. | C | Si | Mn | P | S | Ni | Cr | Mo | Fe |
|---|---|---|---|---|---|---|---|---|---|
| A | 0.06 | 0.45 | 0.65 | 0.010 | 0.011 | — | 7.80 | 0.50 | remainder |
| B | 0.03 | 0.65 | 0.70 | 0.009 | 0.008 | — | 5.13 | 0.53 | ibid. |
| C | 0.03 | 0.79 | 0.56 | 0.009 | 0.012 | 0.01 | 2.34 | 1.04 | ibid. |
| D | 0.03 | 0.70 | 0.90 | 0.007 | 0.016 | 0.03 | 1.30 | 0.57 | ibid. |

As shown in Table 9, overlay welding was performed on the surface of the above-mentioned test base material by combining used welding rods layer-to-layer to form 8 layers. The thickness of each layer was 3 to 4 mm, and the total thickness was approximately 28 mm, and the surface was ground by approximately 5 mm.

The welding condition was that the temperature for preheating, the temperature for pass-to-pass and the temperature at starting of stress release annealing (SR) were set to 250 to 350° C., and the SR treatment was performed under a condition of 630° C. for 36 hours.

TABLE 9

| 1st layer | 2nd layer | 3rd layer | 4th layer | 5th layer | 6th layer | 7th layer | 8th layer |
|---|---|---|---|---|---|---|---|
| A | B | C | D | D | D | D | D |

In order to check performance of the welded portion, overlay welding similar to the above was performed on a plate and a 160 degree bending test was conducted. As the result, no welding crack was observed.

Further, a rotation sliding test of the bearing in accordance with the present invention was performed. All of the overlay welded layers had no ill effect on the bearings, and had an excellent oxidation resistance.

Instead of the present embodiment, it is possible to similarly construct a tandem type power plant of 3000 rpm in which the high pressure steam turbine, the intermediate pressure steam turbine and one or two low pressure steam turbines are coupled in tandem. The high pressure turbine, the intermediate pressure turbine and the low pressure turbines of the present embodiment can be combined in a configuration similar to the turbine configuration B shown in Table 3.

In the present embodiment, the high pressure and the intermediate pressure turbines are operated under a condition of high steam temperature of 625° C. However, in a case where the high pressure and the intermediate pressure turbines are operated under a condition of steam temperatures of 538° C. and 566° C., the CrMoV steel of ASTM-A470 is used for the material for the rotor shafts of these turbines, and the material in the present embodiment may be used for the rotor shaft of the low pressure turbine.

[Embodiment 4]

Table 10 shows the main specification of a steam turbine of 600° C. steam temperature and 700 MW rated output power. In the present embodiment, the turbine type is of a tandem-compound type double-flow type, the blade length of the rotor blade in the final stage in the low pressure turbine is 46 inches, the turbine systems are composed of an integrated unit of one HP (high pressure) and one IP (intermediate pressure) and one LP (configuration (C)) or two LPs (configuration (D)) of 3000 rotations/min, the high temperature portions of the turbines are mainly made of the materials shown in the table. The high pressure part (HP) is operated at a steam temperature of 600° C. and a pressure of 250 kgf/cm$^2$, and the intermediate pressure part (IP) is operated a re-heated steam temperature of 600° C. and a pressure of 45 to 65 kgf/cm$^2$. The steam at a temperature of 400° C. enters into the low pressure part (LP), and the steam at a temperature below 100° C. and a vacuum pressure of 722 mm Hg is guided to the condenser.

In the steam turbine power plant of the present embodiment comprising the integrated unit of the high pressure turbine and the intermediate pressure turbine and the two low pressure turbines, the distance between the bearings is approximately 22.7 m, and the ratio of the total distance between the bearings of the integrated unit of the high pressure turbine and the intermediate pressure turbine and the two low pressure turbines coupled in tandem to the blade length (1168 mm) of the rotor blade in the final stage of the low pressure turbine is 19.4. The ratio of the total length (mm) of the distance between bearings of the integrated unit of the high pressure turbine and the intermediate pressure turbine and the two low pressure turbines coupled in tandem to the rated output power of 1050 MW of the steam turbine plant is 21.6.

On the other hand, in the steam turbine power plant of the present embodiment comprising the integrated unit of the high pressure turbine and the intermediate pressure turbine and the one low pressure turbine, the distance between the bearings is approximately 14.7 m, and the ratio of the total distance between the bearings of the integrated unit of the high pressure turbine and the intermediate pressure turbine and the one low pressure turbine coupled in tandem to the blade length (1168 mm) of the rotor blade in the final stage of the low pressure turbine is 12.6. The ratio of the total length (mm) of the distance between bearings of the integrated unit of the high pressure turbine and the intermediate pressure turbine and the one low pressure turbine coupled in tandem to the rated output power of 700 MW of the steam turbine plant is 21.0.

TABLE 10

| | |
|---|---|
| Type of turbine | TCDF-46 |
| Number of rotation | 3000/3000 rpm |
| Steam condition | 25 MPa - 600° C./600° C. |

TABLE 10-continued

| Turbine configuration | |
|---|---|
| | C: HP–IP–LP–G (with R/H) |
| | D: HP–IP–LP–LP–G (with R/H) |
| Blade structure in first stage | Double tenon tangential entry dovetail |
| Blade in final stage | 46" long blade, High strength 12Cr forged steel |
| Main steam stop valve body | High strength 12Cr forged steel |
| Steam control valve body | |
| H. & I. P. rotor | High strength 12Cr forged steel |
| L. P. rotor | 3.5 Ni—Cr—Mo—V forged steel |
| Rotor blade in H. T. part | First stage: High strength 12Cr forged steel |
| H. & I. P. wheel chamber: | |
| Inner part | High strength 9Cr cast steel |
| Outer part | High strength Cr—Mo—V—B cast steel |
| Thermal efficiency (rated, gross) | 47.1% |

(TCDF: tandem-compound double-flow exhaust, HP: high pressure part, IP: intermediate pressure part, LP: low pressure part, R/H: reheater (boiler))

Figure 15:
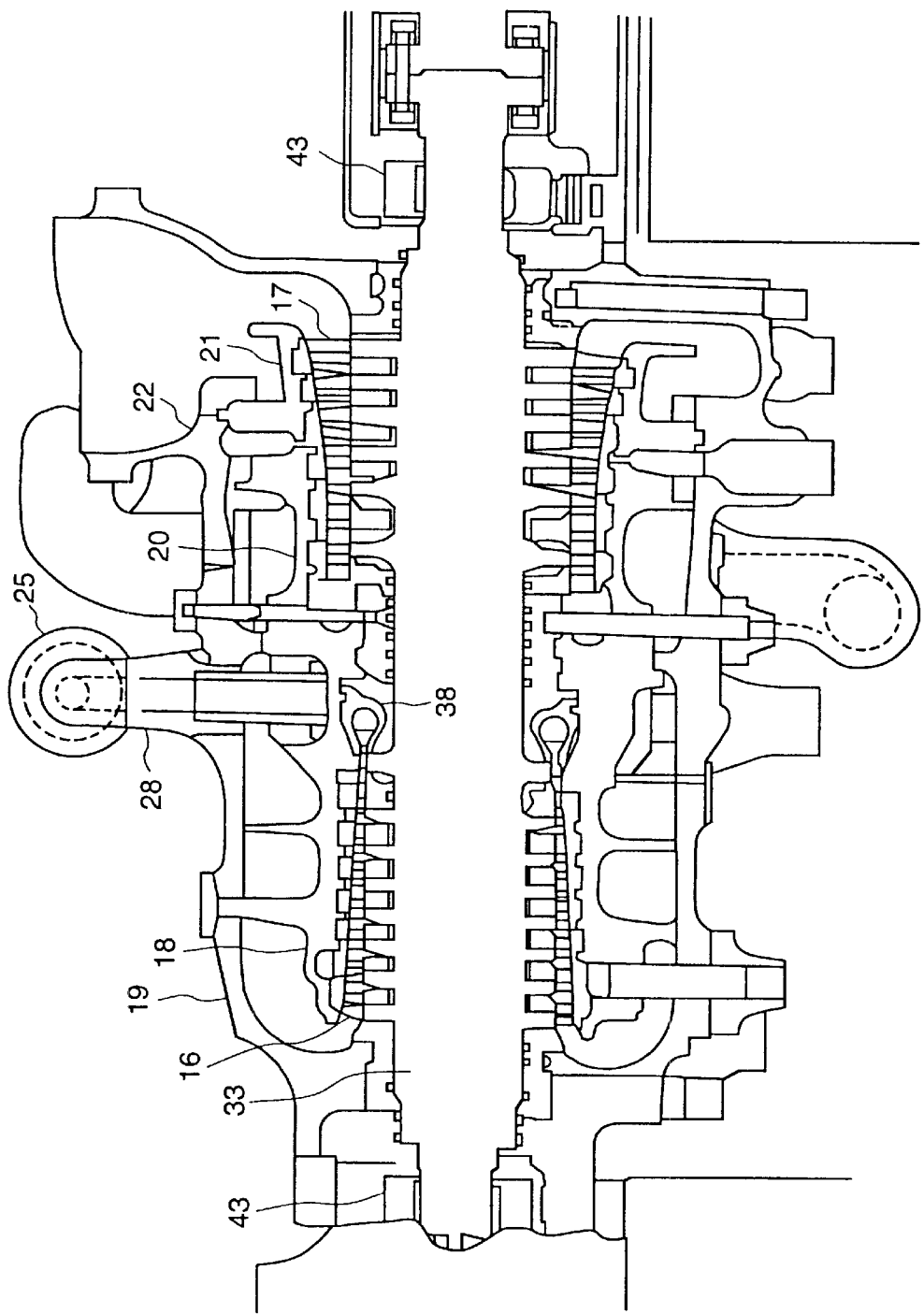
FIG. 15 is a cross-sectional view showing a high-intermediate pressure turbine.

FIG. 15 is a cross-sectional view showing the integrated type high and intermediate pressure steam turbine. The high pressure side steam turbine comprises a high pressure inner wheel chamber 18 and a high and intermediate pressure wheel shaft (high pressure rotor shaft) 33 mounting the high pressure rotor blades 16 in a high pressure outer chamber 19 outside the high pressure inner wheel chamber. The high temperature and high pressure steam described above is obtained by the above-mentioned boiler, and flows through a main steam pipe, and flows through a main steam inlet port 28 from a flange and an elbow 25 composing the main steam inlet port, and conducted to the rotor blades in the first stage from a nozzle box 38. The steam enters from the middle side of the rotor and flows toward the bearing side. The rotor blades are arranged in eight stages in the high pressure side, that is, the left-hand side of the figure and in six stages in the intermediate pressure side (nearly one-half in the right-hand side). Fixed blades are arranged corresponding to these rotor blades. The rotor blades are of a saddle type or a geta type, of dovetail type and of double tenon, and the blade length in the first stage of the high pressure side is approximately 40 mm and the blade length in the first stage of the intermediate pressure side is approximately 100 mm. The length between the bearings 43 is approximately 6.7 m, and the diameter of the smallest portion corresponding to the fixed blade portion is approximately 740 mm, and the ratio of the length between the bearings to the diameter is approximately 9.0.

The width of the base portion of the rotor blade implanting portion in the high pressure side rotor shaft is the widest in the first stage. The widths in the second stage to the seventh stage are narrower than the width in the first stage, and are nearly equal to each other and 0.40 to 0.56 times of the width in the first stage. The width in the final stage is between the width in the first stage and the width in the second stage to the seventh stage, and is 0.46 to 0.62 times of the width in the first stage.

In the high pressure side, the 12% Cr group steel shown in Table 6 is used for the blades and the nozzle. The blade lengths of the rotor blades in this embodiment are 35 to 50 mm in the first stage and become longer stage by stage from the second stage to the final stage, and particularly the blade lengths from the second stage to the final stage are within a range of 50 to 150 mm depending on the output power of the steam turbine. Number of the stages is within a range of 7 to 12. A ratio of the length of the blade portion in the downstream side to the length of the adjacent blade in the upstream side is increased by 1.05 to 1.35, and the ratio is gradually increased toward the downstream side.

The intermediate pressure side steam turbine is driven by the steam exhausted from the high pressure side steam turbine which is re-heated up to 600° C. by the reheater to rotate the generator together with the high pressure side steam turbine at a rotating speed of 3000 rpm. Similar to the high pressure side steam turbine, the intermediate pressure side steam turbine comprises an intermediate pressure inner second wheel chamber 21 and an intermediate pressure outer chamber 22, and fixed blades are arranged opposite to intermediate pressure rotor blades 17. The intermediate pressure blades 17 are in 6 stages. The blade length in the first stage is approximately 130 mm, and the blade length in the final stage is approximately 260 mm. The dovetails are of an inverse-christmas-tree type.

The width of the base portion of the rotor blade implanting portion in the intermediate pressure side rotor shaft is the widest in the first stage. the width in the second stage is narrower than the width in the first stage. The widths in the third stage to the fifth stage are narrower than the width in the second stage, and are nearly equal to each other. The width in the final stage is between the width in the third stage to the fifth stage and the width in the second stage, and is 0.48 to 0.64 times of the width in the first stage. The width in the first stage is 1.1 to 1.5 times of the width in the second stage.

In the intermediate pressure side, the 12% Cr group steel shown in Table 6 is used for the blades and the nozzle. The blade lengths of the rotor blades in this embodiment become longer stage by stage from the first stage to the final stage, and the blade lengths from the second stage to the final stage are within a range of 90 to 350 mm depending on the output power of the steam turbine. Number of the stages is within a range of 6 to 9. A ratio of the length of the blade portion in the downstream side to the length of the adjacent blade in the upstream side is increased by 1.10 to 1.25.

The diameter of the implanting portion of the rotor blade is larger than the diameter of the corresponding fixed blade, and the width depends on the blade length and the position of the rotor blade. The ratio of the width to the blade length of the rotor blade is the largest value of 1.35 to 1.80 in the first stage, 0.88 to 1.18 in the second stage, and is 0.40 to 0.65 decreasing from the third stage to the sixth stage toward the final stage.

In the high pressure and intermediate pressure integrated turbine coupling the two low pressure turbines for the steam turbine power plant of the present embodiment, the distance between the bearings is approximately 5.7 m, and the ratio of the distance between the bearings to the blade length (1168 mm) of the rotor blade in the final stage of the low pressure turbine is 5.7. The ratio of the length (mm) of the distance between bearings of the high pressure and intermediate pressure integrated turbine to the rated output power of 1050 MW of the steam turbine plant is 6.4.

In the present embodiment, the overlay welding layer of the low alloy steel is also provided in the bearing portions similarly to Embodiment 3.

Figure 16:
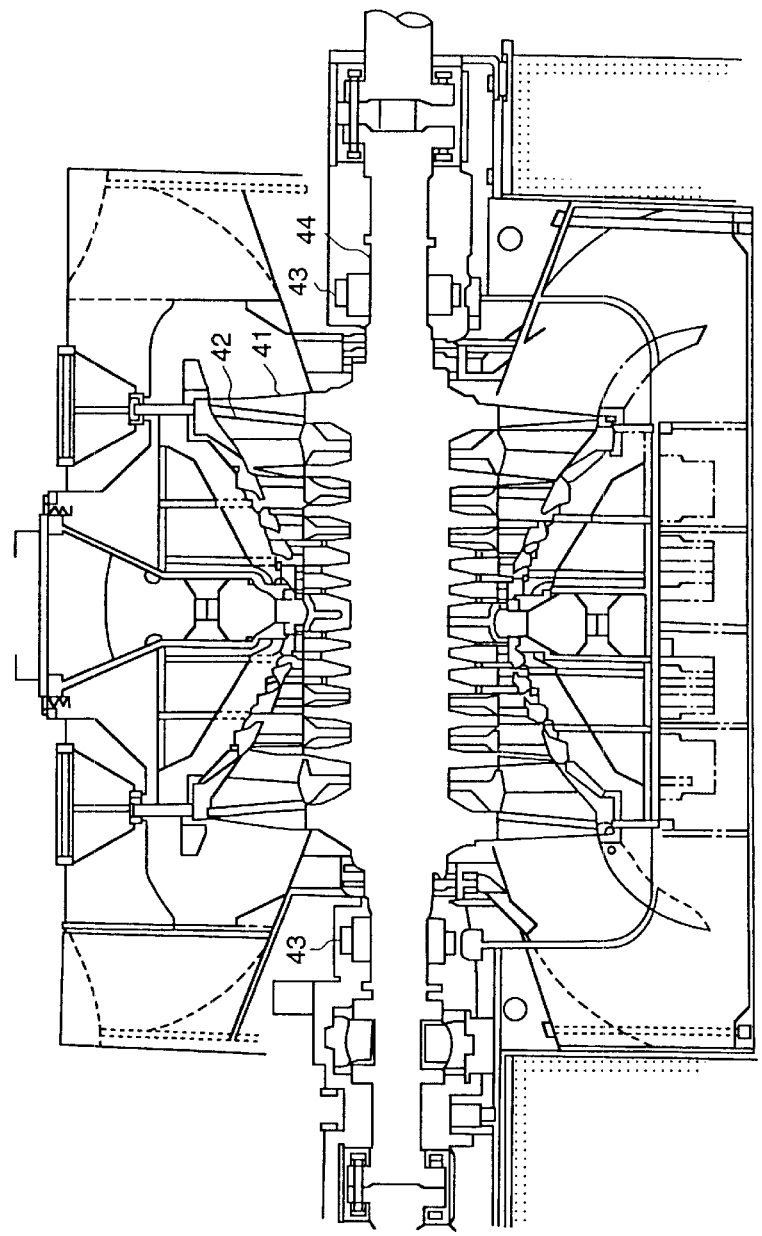
FIG. 16 is a cross-sectional view showing a low pressure turbine.

FIG. 16 is a cross-sectional view showing the low pressure turbine. One unit of the low pressure turbine or two units of the low pressure turbines coupled in tandem are coupled to the high and intermediate pressure turbine. The rotor blades 41 are nearly symmetrically arranged in both sides each six stages, and fixed blades 42 are arranged corresponding to the rotor blades. The steam turbine blades having a blade length of 46 inches in the final stage and made of the high strength 12% Cr steel described in Embodiment 2 are used. The rotor blade used in the present embodiment has the shape shown by FIG. 8 and FIG. 9 of Embodiment 2, and the twisted angle in the top end of the blade portion is also the same. The forged steel of the super clean material having the fully annealed bainite structure is used for the rotor shaft 43, similarly to Embodiment 3. A 12% Cr steel containing Mo of 0.1% is used for both of the rotor blades other than those in the final stage and in the precedent stage and the fixed blades. The aforementioned cast steel containing C of 0.25% is used as the material for the inner and the outer casings. In the present embodiment, the distance between the centers of the bearings is 8 m, and the diameter of the shaft at a position corresponding to the fixed blade portion is approximately 800 mm, and the diameters at the rotor blade implanting portions are the same in all stages. The distance between the bearing centers is 10 times the rotor shaft diameter at the position corresponding to the fixed blades.

In the present embodiment, the implanting portions of the rotor blades are also provided in the rotor shaft. Similarly to Embodiment 3, in addition to the fork type, the inverse Christmas tree type may be also employed to the dovetail in the final stage.

The width of the base portion of the rotor blade implanting portion in the low pressure turbine is the smallest in the first stage, and gradually increases in four steps toward the downstream side. The widths in the second and third stages are the same, and the widths in the forth and the fifth stages are the same. The widths in the final stage is 6.2 to 7.0 times as large as the width in the first stage. The widths in the second and the third stages are 2.2 to 2.6 times as large as the width of the first stage. The widths in the fourth and the fifth stages are 1.15 to 1.40 times as large as the widths of the second and third stages. The width in the final stage is 2.8 to 3.2 times as large as the widths in the fourth and the fifth stages. The width of the base portion is indicated by a crossing point of a broadening extending line and the diameter of the rotor shaft.

The blade lengths of the rotor blades in this embodiment are increased in each stage from 4 inches in the first stage to 46 inches in the final stage, that is, the blade lengths from the first stage to the final stage are within the range of 100 to 1270 mm depending on the output power of the steam turbine. Number of the stages is 8 at the maximum. A ratio of the length of the blade in the downstream side to the length of the adjacent blade in the upstream side in each stage is increased by 1.2 to 1.9.

The diameter of the implanting base portion of the rotor blade is larger than the diameter of the corresponding fixed blade and broadened toward the downstream side, and the width of the implanting portion of the rotor blade is wider as the blade length of the rotor blade is longer. The ratio of the width to the blade length of the rotor blade is 0.30 to 1.5 from the first stage to the stage before the final stage, and the ratio is gradually decreased from the first stage to the stage before the final stage. The ratio in the stage downstream gradually becomes smaller than the ratio in the stage upstream by one stage within the range of 0.15 to 0.40. The ratio in the final stage is 0.50 to 0.65.

In the present embodiment, the average diameter in the final stage rotor blade is set to 2590 mm in case of 3000 rpm and 43 inch blade, 2160 mm in case of 3600 rpm and 36 inch blade, 2665 mm in case of 3000 rpm and 46 inch blade, and 2220 mm in case of 3600 rpm and 38 inch blade.

The erosion shield 54 in the present embodiment is formed by bonding a stellite alloy plate bonded on the blade through electron beam welding or TIG welding. The erosion shields 54 are welded over the whole length of the erosion shield onto two positions of the leading portion of the blade on which the wet steam directly hits and the back side opposite to the leading portion. The width of the erosion shield in the leading portion is wider than the width of the erosion shield in the back side, and both of the upper and the lower end portions of the erosion shield are also welded.

In addition to the present embodiment, the similar configuration can be applied to a 1000 MW class large capacity power plant in which the steam inlet temperature to the high and intermediate pressure steam turbine is above 610° C., and the steam inlet temperature to the low pressure steam turbine is approximately 400° C. and the outlet temperature is approximately 60° C.

The high temperature and high pressure steam turbine plant in the present embodiment is mainly composed of a boiler, the high and intermediate pressure turbine, the low pressure turbine, a condenser, a condensate pump, a low pressure feed water heater system, a deaerator, a pressurizing pump, a feed pump, a high pressure feed water heater system and so on. That is, the ultra high temperature high pressure steam generated in the boiler enters into the high pressure side turbine to generate power, and after being re-heated by the boiler, enters into the intermediate pressure side turbine to generate power. The steam exhausted from the high and intermediate pressure turbine enters into the low pressure turbine to generate power, and then is condensed by the condenser. The condensed liquid is transferred to the low pressure feed water heater system and the deaerator. The feed water deaerated by the deaerator is transferred to the high pressure feed water heater by the pressurizing pump and the feed water pump to be heated, and then returned to the boiler.

There, in the boiler, the feed water is changed to the high temperature high pressure steam by passing through an economizer, an evaporator, a super-heater. On the other hand, the boiler combustion gas after heating the steam flows out of the economizer, and then enters into an air heater to heat air. Therein, a feed pump driving turbine driven by a bled steam from the intermediate pressure turbine is used to drive the feed water pump.

In the high temperature high pressure turbine plant constructed as described above, since the temperature of the feed water flowing out from the high pressure feed water heater system is higher than the feed water temperature in a conventional thermal power plant, the temperature of the combustion gas flowing out from the economizer in the boiler is inevitably higher than the temperature of the combustion gas in the conventional thermal power plant. Therefore, decreasing of the gas temperature is prevented by recovering the heat from the boiler exhaust gas.

The generator of 1050 MW output class of the present embodiment requires a high strength generator shaft. It is preferable that the material has the fully annealed bainite structure, and contains C of 0.15 to 0.30%, Si of 0.1 to 0.3%, Mn less than 0.5%, Ni of 3.25 to 4.5%, Cr of 2.05 to 3.0%, Mo of 0.25 to 0.6% and V of 0.05 to 0.20%, and has a tensile strength at room temperature above 93 kgf/mm$^2$, particularly above 100 kgf/mm$^2$; a 50% FATT below 0° C. particularly preferable below −20° C.; and a magnetizing force at 21.2 KG below 985 AT/cm, and contains P, S, Sn, Sb, As as impurities less than 0.025% in total, and has a ratio of Ni/Cr less than 2.0.

Table 6 shows chemical compositions (weight %) of the materials used for the main portion of the high and intermediate pressure turbine and the low pressure turbine in the present embodiment. In this embodiment, the rotor shaft integrated for the high pressure side and the intermediate pressure side was made of the steel having the fully annealed martensite structure containing C of 0.11%; Si of 0.02%; Mn of 0.45%; Ni of 0.50%; Cr of 11.21%; Mo of 0.25%; W of 2.78%; V of 0.20%; Nb of 0.07%; Co of 1.50%; N of 0.017%; B of 0.016%; and the remainder of Fe, and the other components were made of the materials shown in Table 6. Therefore, there occurred no problem caused by difference in thermal expansion coefficient because all the components were made of the materials having a ferrite group crystal structure and a thermal expansion coefficient of nearly 12×10$^{-6}$/° C.

The rotor shaft of the high and intermediate pressure turbine was manufactured by melting 30 tons of the heat resistant cast steel described in Table 6 using an electric furnace, performing carbon vacuum deoxidization, casting in a metal mold, forging the molded material to form an electrode rod, performing electro-slug re-melting so as to melt cast steel from the upper portion to the lower portion using the electrode rod, and forging the obtained material to form in a rotor shape (1450 mm diameter, 5000 mm length). The forging was performed under a temperature below 1150° C. in order to prevent occurrence of forging crack. Further, the forged steel after annealing treatment was performed with quenching treatment by being heated up to 1050° C. and cooled with water spray, and annealed twice at 570° C. and 690° C., and then cut into the final shape. The materials and the manufacturing conditions for the other components were the same as described in Embodiment 3. Further, the overlay welding layer of the Cr—Mo low alloy steel was also formed onto the bearing portions, in the same manner as in Embodiment 3.

In the low pressure turbine of the present embodiment for the steam turbine power plant comprising the two low pressure turbines coupled in tandem, the total distance between the bearings is 16 m, and the ratio of the total distance between the bearings of the two low pressure turbines coupled in tandem to the blade length (1168 mm) of the rotor blade in the final stage of the low pressure turbine is 13.7. The ratio of the total length (mm) of the distance between bearings of the two low pressure turbines coupled in tandem to the rated output power of 1050 MW of the steam turbine plant is 15.2.

On the other hand, in the steam turbine power plant of the present embodiment comprising the high and intermediate pressure integrated turbine having a high pressure turbine and an intermediate pressure turbine integrated together and one low pressure turbine, the distance between the bearings of the low pressure turbine is 6 m, and the ratio of the distance between the bearings to the blade length (1168 mm) of the rotor blade in the final stage of the low pressure turbine is 6.8. The ratio of the distance (mm) between bearings of the one low pressure turbine to the rated output power of 700 MW of the steam turbine plant is 11.4.

Although the high and intermediate pressure integrated rotor shaft of this embodiment has a center hole, the center hole may be eliminated by employing the highly pure material containing P less than 0.010%, S less than 0.005%, As less than 0.005%, Sn less than 0.005%, Sb less than 0.003%.

The low pressure turbine of the present embodiment can be directly used when the steam temperature is 538° C. or 566° C.

According to the present invention, the martensite steel can satisfy the tensile strength and the toughness required by the blades in the final stage of the low pressure steam turbine, and as a result there is the large effect that the low pressure steam turbine using the long blades having a blade length above 48 inches for a 3000 rpm turbine or a blade length above 40 inches for a 3600 rpm turbine can be provided. Further, there is the large effect that the compact steam turbine power plant having a higher thermal efficiency can be provided.

What is claimed is:

1. A steam turbine blade made of a martensite steel having a 20° C. V-notch impact value, wherein said 20° C. V-notch impact value is larger than a value (y) (kg×in/cm$^2$) calculated by an equation (y=−0.44x+68) where (x) is a 20° C. tensile strength (kg/mm$^2$), having an erosion preventive layer in a top end leading edge portion of the blade.

2. A steam turbine blade according to claim 1, wherein said blade has a blade length above 45 inches for a 3000 rpm turbine or a blade length above 37.5 inches for a 3600 rpm turbine which is made of a martensite steel having a 20° C. V-notch impact value larger than 6 kg-m/cm$^2$ and a 20° C. tensile strength larger than 140 kg/mm$^2$.

3. A steam turbine blade according to claim 2, which is made of a martensite steel containing C of 0.13–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35%; and N of 0.04–0.15%, on the basis of weight.

4. A steam turbine power generating plant comprising a high pressure turbine, an intermediate pressure turbine and one or two low pressure turbines connected in tandem or cross, wherein blades in a final stage of said low pressure turbine are the steam turbine blades according to claim 1.

5. A steam turbine power generating plant comprising a set of a high pressure turbine and a low pressure turbine and a generator; and a set of an intermediate pressure turbine and a low pressure turbine and a generator, said sets being connected in tandem or cross, wherein blades in a final stage of said low pressure turbines are the steam turbine blades according to claim 1.

6. A low pressure steam turbine comprising a rotor shaft; rotor blades mounted on said rotor shaft; fixed blades for guiding flow of steam to said rotor blades; and a casing holding said fixed blades, wherein said rotor blades in a final stage are the steam turbine blades according to claim 1.

7. A low pressure steam turbine according to claim 6, wherein said rotor shaft is made of a bainite steel having a 0.02% yield strength at room temperature above 80 kg/mm$^2$ in the central portion of said rotor shaft; 0.2% yield strength above 87.5 kg/mm$^2$ or a tensile strength above 92 kg/mm$^2$; and a FATT below −5° C. or a 20° C. V-notch impact value above 10 kg-m.

8. A low pressure steam turbine according to claim 6, wherein said bainite steel is a forged steel containing C of 0.20–0.28%; Si less than 0.15%; Mn less than 0.25%; Ni of 3.25–4.25%; Cr of 1.6–2.5%; Mo of 0.25–0.6%; and V of 0.05–0.20%; on the basis of weight.

9. A low pressure steam turbine comprising a rotor shaft; rotor blades mounted on said rotor shaft; fixed blades for guiding flow of steam to said rotor blades; and a casing holding said fixed blades, a rotating speed of the low pressure turbine being 3000 rpm or 3600 rpm, which comprises five stages of said rotor blades symmetrically arranged in both sides, and is of a double flow construction having said rotor blades in the first stages being mounted in a middle portions of said rotor shaft, and said rotor blades in the final stages are the steam turbine blades according to claim 1.

10. A low pressure steam turbine blade, which is made of a martensite steel containing C of 0.19–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35%; and N of 0.04–0.15%, on the basis of weight, having an erosion preventive layer in a top end leading edge portion of the blade.

11. A low pressure steam turbine blade according to claim 10, wherein said martensite steel contains C of 0.25–0.40% and Mo of 1.5–2.0%; or C of 0.19–0.40% and Mo of 3–4%, on the basis of weight and a 20° C. tensile strength larger than 140 kg/mm$^2$.

12. A steam turbine power generating plant comprising a high pressure turbine, an intermediate pressure turbine and one or two low pressure turbines connected in tandem or cross, wherein blades in a final stage of said low pressure turbine are the steam turbine blades according claim 10.

13. A steam turbine power generating plant comprising a set of a high pressure turbine and a low pressure turbine and a generator; and a set of an intermediate pressure turbine and a low pressure turbine and a generator, said sets being connected in tandem or cross wherein blades in a final stage of said low pressure turbines are the steam turbine blades according to claim 10.

14. A low pressure steam turbine comprising a rotor shaft; rotor blades mounted on said rotor shaft; fixed blades for guiding flow of steam to said rotor blades; and a casing holding said fixed blades, wherein said rotor blades in a final stage are the steam turbine blades according to claim 10.

15. A low pressure steam turbine comprising a rotor shaft; rotor blades mounted on said rotor shaft; fixed blades for guiding flow of steam to said rotor blades; and a casing holding said fixed blades, and wherein a rotating speed of the low pressure turbine is 3000 rpm or 3600 rpm, and which comprises five stages of said rotor blades symmetrically arranged in both sides and is of a double flow construction having said rotor blades in the first stages being mounted in a middle portions of said rotor shaft, and said rotor blades in the final stages are the steam turbine blades according to claim 10.

16. A low pressure steam turbine blade according to claim 10, wherein said martensite steel contains at least one of Ti Zr and Hf of less than 0.5% in total.

17. A low pressure steam turbine blade according to claim 10, wherein said martensite steel contains at least one of Al, Ca, Mg, Y and rare-earth elements of less than 0.5% in total.

18. A steam turbine blade having a blade length above 45 inches for a 3000 rpm turbine or a blade length above 37.5 inches for a 3600 rpm turbine, which is made of a martensite steel containing C of 0.16–0.40%; Si less than 0.5%; Mn less than 1.5%; Ni of 2–3.5%; Cr of 8–13%; at least one kind of Nb and Ta of 0.02–0.3% in total; V of 0.05–0.35%; and N of 0.04–0.15%, on the basis of weight and a 20° C. tensile strength larger than 140 kg/mm$^2$, having an erosion preventive layer in a top end leading edge portion of the blade.

19. A steam turbine blade having a blade length above 45 inches for a 3000 rpm turbine or a blade length above 37.5 inches for a 3600 rpm turbine, which is made of a martensite steel containing C of 0.15–0.40%; Si less than 0.5%; Mn less than 1.5%; Ni of 2–3.5%; Cr of 8–13%; at least one kind of Nb and Ta of 0.02–0.3% in total; V of 0.05–0.35%; and N of 0.04–0.15%, on the basis of weight, wherein a combination of said amount of C and said amount of Mo falls within a range formed by connecting to points A (0.21%, 1.5%), B (0.15%, 2.5%), C (0.15%, 3.2%) and D (0.25%, 4.0%) and a 20° C. tensile strength larger than 140 kg/mm$^2$, having an erosion preventive layer in a top end leading edge portion of the blade.

20. A martensite steel having a 20° C. V-notch impact value, wherein said 20° C. V-notch impact value is larger than a value (y) (kg×m/cm$^2$) calculated by an equation (y=–0.44x+68) where (x) is a 20° C. tensile strength (kg/mm$^2$).

21. A martensite steel according to claim 20 having a 20° C. V-notch impact value larger than 6 kg-m/cm$^2$ and a 20° C. tensile strength larger than 140 kg/mm$^2$.

22. A martensite steel according to claim 20, which contains C of 0.13–0.40%; Si less than 0.5%, Mn less than 1.5%, Ni of 2–3.5%; Cr of 8–13%; Mo of 1.5–4%; at least one kind of Nb and Ta of 0.02–0.3% in total; V of 0.05–0.35%; and N of 0.04–0.15%, on the basis of weight.

23. A martensite steel, which contains C of 0.19–0.40%; Si less than 0.5%; Mn less than 1.5%; Ni of 2–3.5%; Cr of 8–13%; Mo of 1.5–4%; at least one kind of Nb and Ta of 0.02–0.3% in total; V of 0.05–0.35%; and N of 0.04–0.15%, on the basis of weight.

24. A martensite steel according to claim 23, which contains C of 0.25–0.40% and Mo of 1.5–2.0%; or C of 0.19–0.40% and Mo of 3–4%, on the basis of weight and a 20° C. tensile strength larger than 140 kg/mm$^2$.

25. A martensite steel, which contains C of 0.19–0.40%; Si less than 0.5%, Mn less than 1.5%; Ni of 2–3.5%; Cr of 8–13%, at least one kind of Nb and Ta of 0.02–0.3% in total; V of 0.05–0.35%; and N of 0.04–0.15%, on the basis of weight and a 20° C. tensile strength larger than 140 kg/mm$^2$.

26. A martensite steel, which contains C of 0.15–0.40%; Si less than 0.5%; Mn less than 1.5; Ni of 2–3.5%; Cr of 8–13%; at least one kind of Nb and Ta of 0.02–0.3% in total; V of 0.05–0.35%; and N of 0.04–0.15%, on the basis of weight, wherein, an under limit of said amount of C for said amount of Mo falls within a range formed by connecting to points A (0.21%, 1.5%), B (0.15%, 2.5%), C (0.15%, 3.2%) and D (0.25%, 4.0%) and a 20° C. tensile strength larger than 140 kg/mm$^2$.

* * * * *